(12) United States Patent
Nakanishi

(10) Patent No.: US 10,431,177 B2
(45) Date of Patent: Oct. 1, 2019

(54) DISPLAY APPARATUS AND CONTROL METHOD FOR THE SAME

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 199 days.

(21) Appl. No.: 15/451,782

(22) Filed: Mar. 7, 2017

(65) Prior Publication Data

US 2017/0278474 A1 Sep. 28, 2017

(30) Foreign Application Priority Data

Mar. 22, 2016 (JP) .................. 2016-056846

(51) Int. Cl.
*G09G 3/36* (2006.01)
*B60R 1/00* (2006.01)

(52) U.S. Cl.
CPC ............. *G09G 3/3677* (2013.01); *B60R 1/00* (2013.01); *G09G 3/3607* (2013.01); *B60R 2300/202* (2013.01); *B60R 2300/30* (2013.01); *B60R 2300/8046* (2013.01); *G09G 2300/0452* (2013.01); *G09G 2330/023* (2013.01)

(58) Field of Classification Search
CPC . B60R 1/00; B60R 2300/202; B60R 2300/30; B60R 2300/8046; G09G 2300/0452; G09G 2330/023; G09G 3/3607; G09G 3/3677
See application file for complete search history.

(56) References Cited

U.S. PATENT DOCUMENTS

| | | | |
|---|---|---|---|
| 2007/0296673 A1* | 12/2007 | Kang ................... | G09G 3/3406 345/92 |
| 2008/0094320 A1* | 4/2008 | Parikh ................. | G09G 3/3233 345/76 |
| 2009/0315921 A1 | 12/2009 | Sakaigawa et al. | |
| 2013/0106895 A1* | 5/2013 | Jeong .................. | G09G 3/3648 345/589 |
| 2013/0307884 A1 | 11/2013 | Saitoh et al. | |
| 2013/0321484 A1* | 12/2013 | Kim ..................... | G09G 3/3233 345/690 |
| 2014/0092080 A1* | 4/2014 | Fukunaga ............ | G09G 3/3696 345/212 |
| 2015/0170607 A1* | 6/2015 | Shin ........................ | G09G 3/20 345/690 |
| 2016/0027404 A1* | 1/2016 | Nakanishi ................ | G09G 5/02 345/590 |

FOREIGN PATENT DOCUMENTS

| | | |
|---|---|---|
| JP | 2010-33009 A | 2/2010 |
| WO | 2012/108361 A1 | 8/2012 |

OTHER PUBLICATIONS

Japanese Office Action dated Jul. 2, 2019, for corresponding Japanese Patent Application No. 2016-056846.

* cited by examiner

*Primary Examiner* — Viet D Pham
(74) *Attorney, Agent, or Firm* — Michael Best & Friedrich LLP

(57) ABSTRACT

According to an aspect, a display apparatus includes: a plurality of first pixels to which at least one color is allocated; and a second pixel to which a high luminance color having higher luminance than luminance of the color of the first pixels is allocated. The first pixels are driven at a first drive frequency. The second pixel is driven at a second drive frequency higher than the first drive frequency.

16 Claims, 16 Drawing Sheets

US 10,431,177 B2

DISPLAY APPARATUS AND CONTROL METHOD FOR THE SAME

CROSS-REFERENCE TO RELATED APPLICATIONS

This application claims priority from Japanese Application No. 2016-056846, filed on Mar. 22, 2016, the contents of which are incorporated by reference herein in its entirety.

BACKGROUND

1. Technical Field

The present invention relates to a display apparatus and a control method for the display apparatus.

2. Description of the Related Art

Display apparatuses including sub-pixels of red, green, blue, and white serving as constituent units of one pixel are known (e.g., Japanese Patent Application Laid-open Publication No. 2010-33009).

By increasing the refresh rate, which is the update frequency of frame images, display apparatuses cause transition of the frame images to be less likely to be visually recognized. Especially in display of video, a higher refresh rate causes a motion of a displayed moving object to be more likely to be visually recognized as a smoother motion.

A higher refresh rate, however, increases power consumption in a drive system that drives pixels in the display apparatuses. As the number of sub-pixels included in one pixel increases like in display apparatuses having four sub-pixels of red, green, blue, and white, the increase in power consumption in the drive system is more likely to be significant.

For the foregoing reasons, there is a need for a display apparatus and a control method for the display apparatus that can increase the refresh rate and reduce the degree of an increase in power consumption.

SUMMARY

According to an aspect, a display apparatus includes: a plurality of first pixels to which at least one color is allocated; and a second pixel to which a high luminance color having higher luminance than luminance of the color of the first pixel is allocated. The first pixels are driven at a first drive frequency. The second pixel is driven at a second drive frequency higher than the first drive frequency.

According to another aspect, a control method for a display apparatus including a plurality of first pixels to which at least one color is allocated and a second pixel to which a high luminance color having higher luminance than luminance of the color of the first pixels is allocated, the control method includes driving the first pixels at a first drive frequency; and driving the second pixel at a second drive frequency higher than the first drive frequency.

According to another aspect, a display apparatus includes: a plurality of first pixels to which at least one color is allocated; a second pixel to which a high luminance color having higher luminance than luminance of the color of the first pixel is allocated; a first scanning line coupled to the first pixels; and a second scanning line coupled to the second pixel. The first scanning line and the second scanning line are coupled to an input line that receives a drive signal. At least the first scanning line is coupled to the input line via a switching circuit that is configured to be switched to transmit the drive signal.

DETAILED DESCRIPTION

Figure 1:
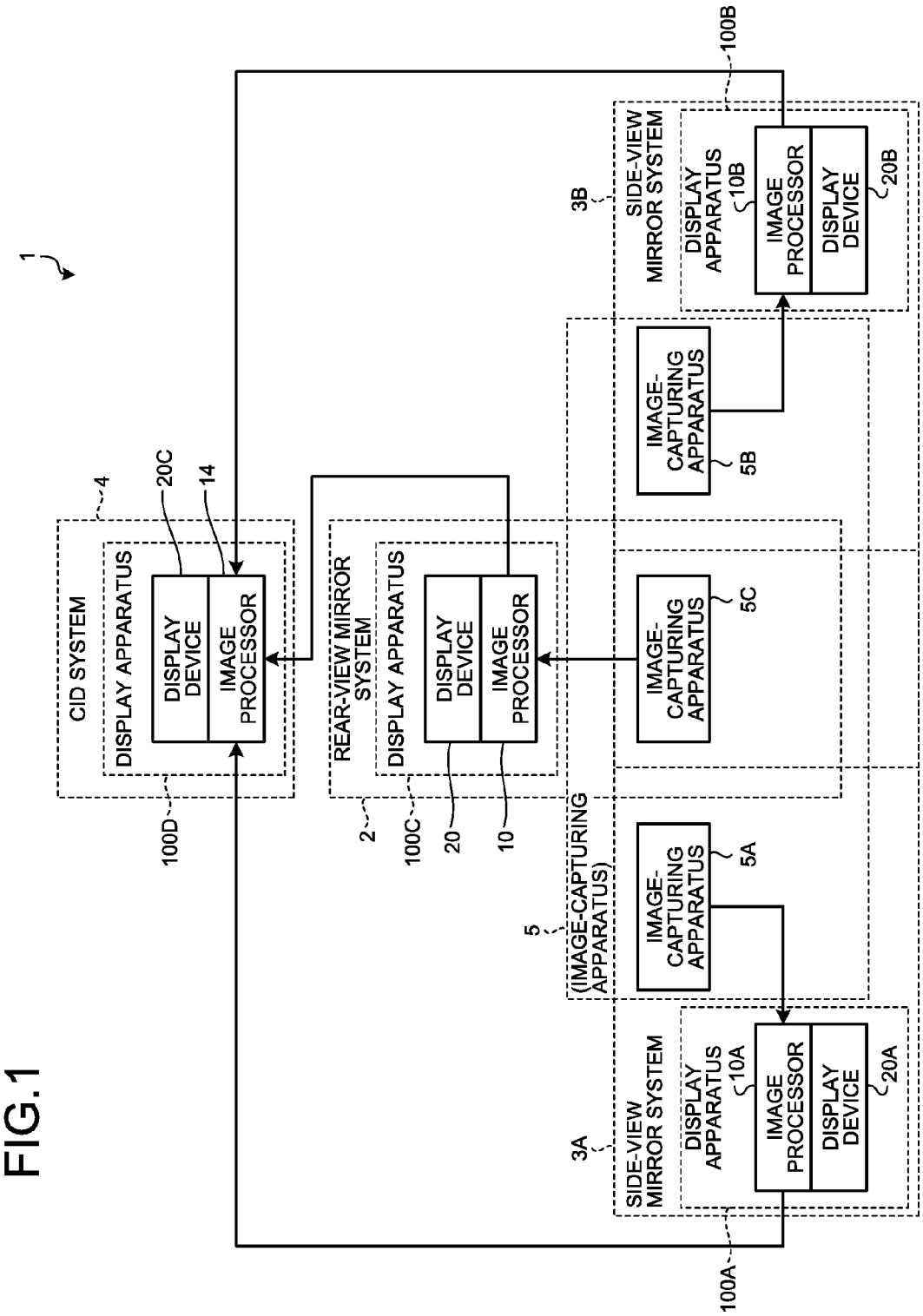
FIG. 1 is a diagram of a main configuration of display equipment according to an embodiment.

An exemplary embodiment according to the present invention is described below with reference to the accompanying drawings. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to preceding figures are denoted by the same reference numerals, and overlapping detailed explanation thereof will be appropriately omitted.

In this disclosure, when an element is described as being "on" another element, the element can be directly on the other element, or there can be one or more elements between the element and the other element.

Embodiment

FIG. 1 is a diagram of a main configuration of display equipment 1 according to an embodiment. As illustrated in FIG. 1, the display equipment 1 includes a rear-view mirror system 2, two side-view mirror systems 3A and 3B, and a center information display (CID) system 4. The display equipment 1 is what is called an on-board display system provided in a car serving as a movable body. A coupling system that transmits signals between apparatuses in the display equipment 1 may be a wired or wireless system.

The rear-view mirror system 2 and the side-view mirror systems 3A and 3B each include an image-capturing apparatus 5 and a display apparatus. The rear-view mirror system 2 and the side-view mirror systems 3A and 3B can each function as one unit of processing (display equipment). The respective display apparatuses 100C, 100A, and 100B of the rear-view mirror system 2 and the side-view mirror systems 3A and 3B according to the present embodiment include image processors 10, 10A, and 10B that are integrated circuits and perform image processing on an image to be displayed by respective display devices 20, 20A, and 20B. This configuration is given by way of example only, and the present embodiment is not limited thereto. The display apparatus, for example, may have a configuration corresponding to the display device 20. In this case, the component corresponding to the image processor 10 is provided as an external component (e.g., an image processing device) coupled to the display apparatus.

Figure 2:
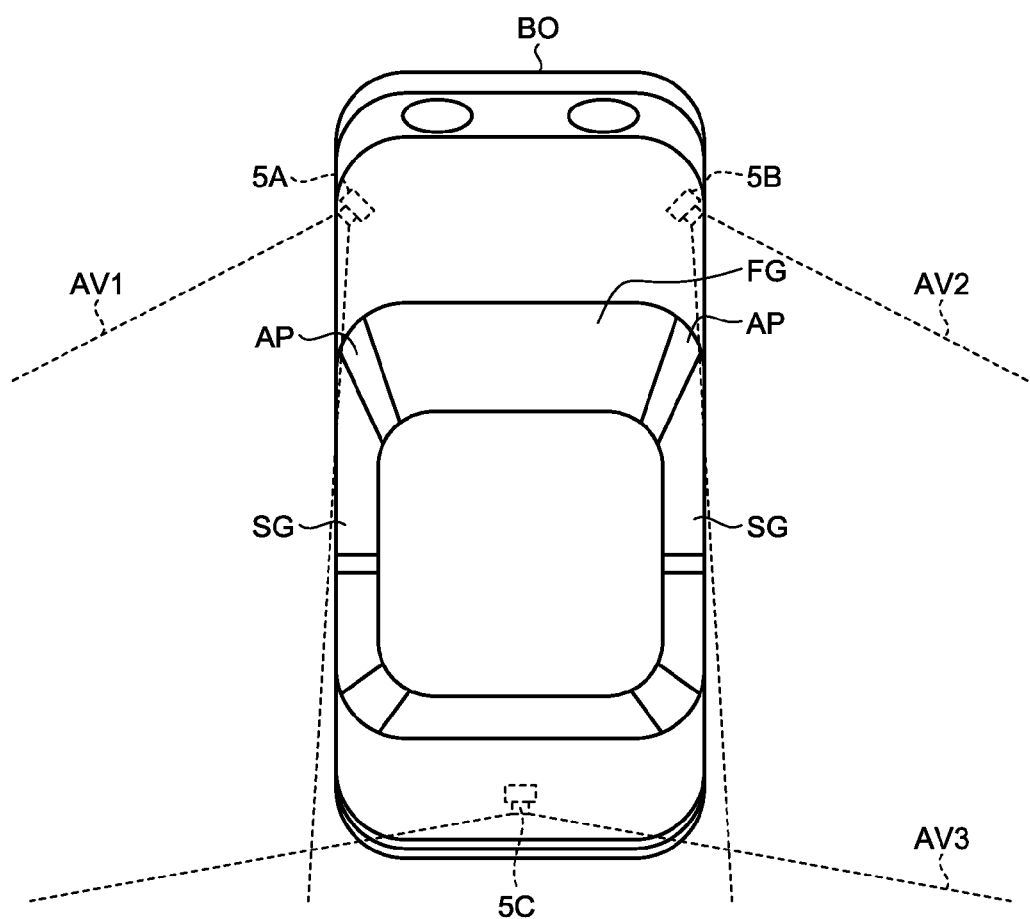
FIG. 2 is a schematic diagram of exemplary arrangement of image-capturing apparatuses of a rear-view mirror system and side-view mirror systems.

FIG. 2 is a schematic diagram of exemplary arrangement of image-capturing apparatuses 5A, 5B, and 5C of the rear-view mirror system 2 and the side-view mirror systems 3A and 3B. In FIG. 2, angles of view of the image-capturing apparatuses 5A, 5B, and 5C are indicated by the dashed lines. As illustrated in FIG. 2, for example, the display equipment 1 according to the present embodiment includes three image-capturing apparatuses 5A, 5B, and 5C. The three image-capturing apparatuses 5A, 5B, and 5C are arranged on both sides and the rear side, respectively, of a body BO of a car. Image-capturing elements of the three image-capturing apparatuses 5A, 5B, and 5C are exposed outward through a lens, and their angles of view extend toward the outside of the car. In other words, the three image-capturing apparatuses 5A, 5B, and 5C take images with which the states outside the car can be checked. More specifically, the respective image-capturing apparatuses 5A and 5B on both sides of the car and the image-capturing apparatus 5C on the rear side of the car are arranged such that respective angles of view AV1 and AV2 of the image-capturing apparatuses 5A and 5B and an angle of view AV3 of the image-capturing apparatus 5C extend at least successively. More preferably, the image-capturing apparatuses 5A, 5B and 5C are arranged such that the angles of view extend in a manner partly overlapping with each other. With this arrangement, the state behind the angles of view on the front side of the car in the angles of view AV1 and AV2 of the image-capturing apparatuses 5A and 5B on both sides of the car can be included in image-capturing ranges of the three image-capturing apparatuses 5A, 5B, and 5C. In the configuration according to the present embodiment, the display device 20 of the rear-view mirror system 2 displays an image taken by the image-capturing apparatus 5C, the display device 20A of the side-view mirror system 3A displays an image taken by the image-capturing apparatus 5A, and the display device 20B of the side-view mirror system 3B displays an image taken by the image-capturing apparatus 5B, for example. This configuration is given by way of example only, and the present embodiment is not limited thereto. The configuration may be appropriately changed. The image-capturing apparatuses 5A, 5B, and 5C may be hereinafter referred to as the image-capturing apparatus 5 when they need not particularly be distinguished from one another.

Figure 3:
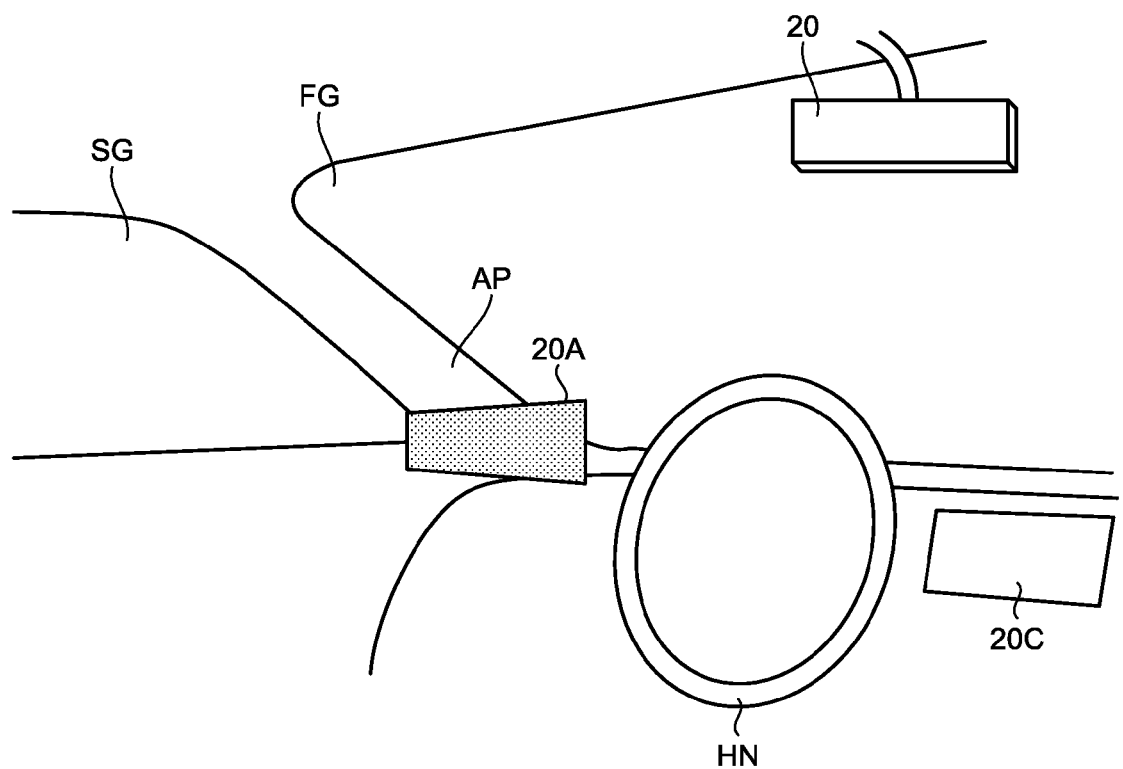
FIG. 3 is a schematic diagram of exemplary arrangement of a display apparatus of the side-view mirror system.

FIG. 3 is a schematic diagram of exemplary arrangement of the display device 20A of the side-view mirror system 3A. The display device 20A of the side-view mirror system 3A is arranged on a side of a driver's seat in a four-wheeled car. Specifically, as illustrated in FIG. 3, the display device 20A of the side-view mirror system 3A is provided near the root end of an A pillar AP between a windshield FG and a side glass SG, for example. The display device 20B of the side-view mirror system 3B is provided at a position on the opposite side of the display device 20A of the side-view mirror system 3A in the horizontal direction with respect to the driver's seat provided with a steering wheel HN and the like. The display devices 20A and 20B of the side-view mirror systems 3A and 3B, respectively, mainly display images indicating the states on both sides of the body BO out of the states outside the car. In other words, the side-view mirror systems 3A and 3B can be used to check the states outside the car on both sides, which have conventionally been checked with door mirrors or fender mirrors. The display device 20 of the rear-view mirror system 2 is provided near the upper center of the windshield FG, for example, and substitutes for a conventional rear-view mirror. In other words, the rear-view mirror system 2 can be used to check the state outside the car on the rear side, which has conventionally been checked with the conventional rear-view mirror.

The CID system 4 includes a display apparatus 100D. The display apparatus 100D includes an image processor 14 and a display device 20C, for example. The display device 20C of the CID system 4 is provided on a dashboard, for example, and displays navigational information and the like of a car navigation system. The display device 20C of the CID system 4 may be provided as a display apparatus that outputs information similar to information indicated by gauges, such as a speedometer, a tachometer, a fuel gauge, a water-temperature gauge, and an odometer.

The CID system 4 according to the present embodiment is coupled to the rear-view mirror system 2 and the side-view mirror systems 3A and 3B in a manner capable of receiving data therefrom. Specifically, the CID system 4 is coupled to the rear-view mirror system 2 and the side-view mirror systems 3A and 3B via an interface, such as high-definition multimedia interface (HDMI™). This coupling form is given just as an example of a specific form of coupling of the CID system 4 to the rear-view mirror system 2 and the side-view mirror systems 3A and 3B. Thus, the coupling form is not limited thereto and may be appropriately changed. The systems may output data as substitutes for each other. If any one of the display devices 20 of the rear-view mirror system 2 and the display devices 20A and 20B of the side-view mirror systems 3A and 3B is broken down, for example, the display device 20C of the CID system 4 displays and outputs data as a substitute for the broken display apparatus. The image processor 14 performs various types of processing relating to display output performed by the display device 20C of the CID system 4 besides processing performed by the image processor 10, which will be described later.

Figure 4:
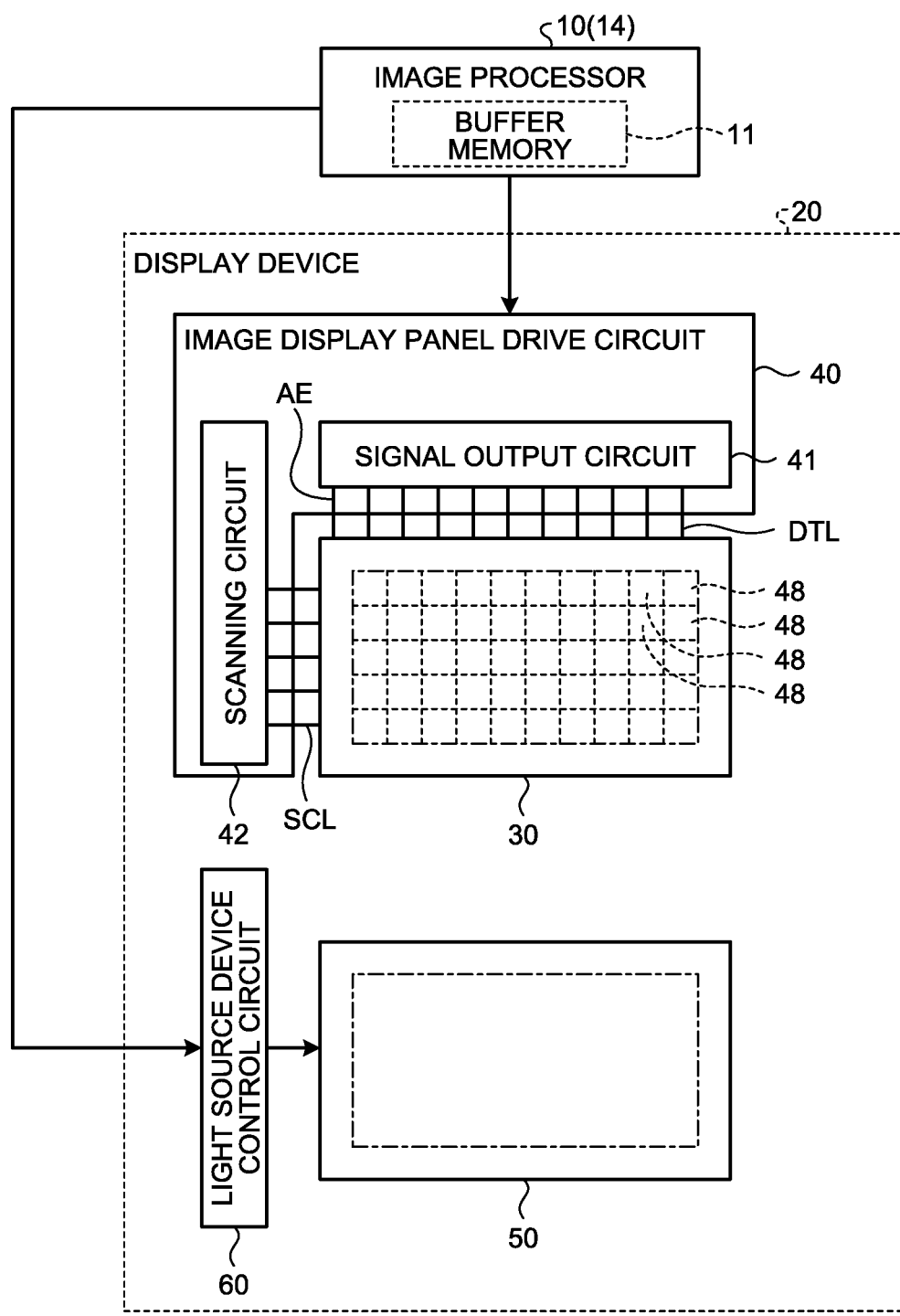
FIG. 4 is a block diagram of an exemplary configuration of the display apparatus.
Figure 5:
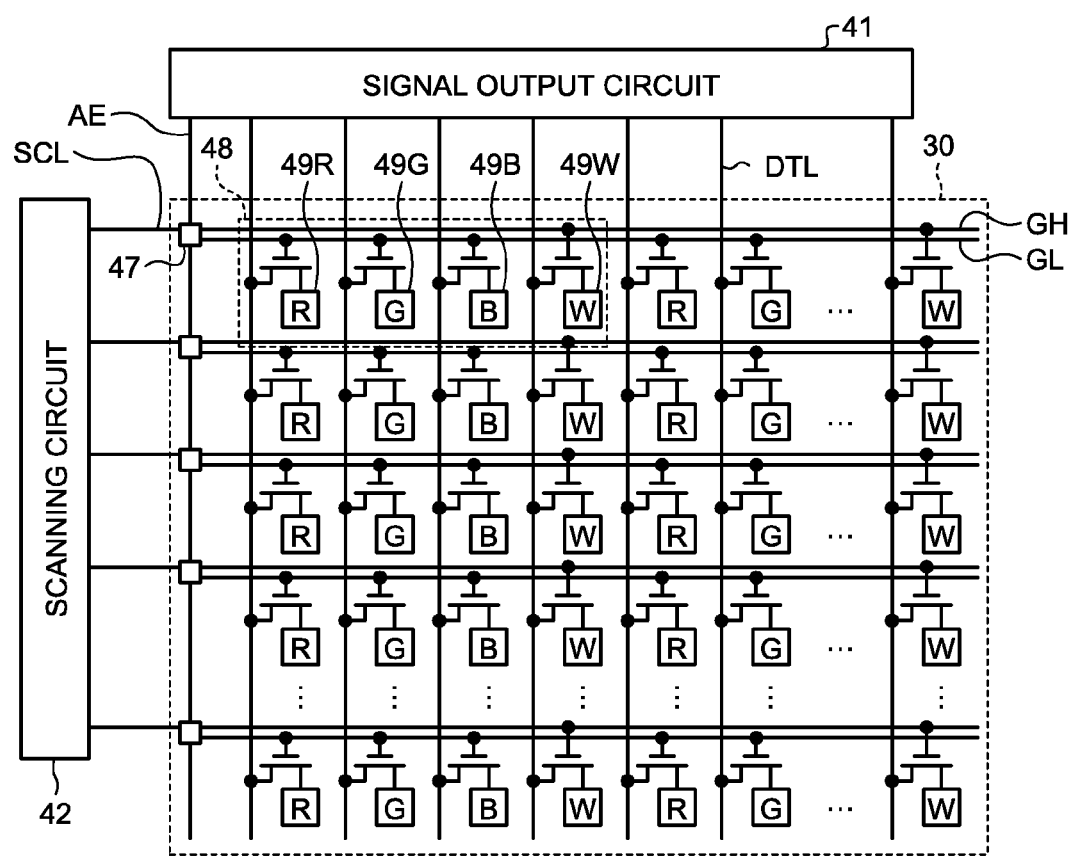
FIG. 5 is a conceptual diagram of an image display panel and an image-display-panel drive circuit of a display device according to the present embodiment.

FIG. 4 is a block diagram of an exemplary configuration of the display device 20. FIG. 5 is a conceptual diagram of an image display panel 30 and an image-display-panel drive circuit 40 of the display device 20 according to the present embodiment. The display devices 20A and 20B of the side-view mirror systems 3A and 3B and the display device 20C of the CID system 4 according to the present embodiment have the same configuration as that of the display device 20 illustrated in FIGS. 4 and 5. Hereinafter, the display devices 20, 20A, 20B, and 20C are collectively referred to as the display device 20.

As illustrated in FIG. 4, the display device 20 includes the image display panel 30, the image-display-panel drive circuit 40, a light source device 50, and a light-source-device control circuit 60. The image display panel 30 displays an image based on output signals output from the image processor 10. The image-display-panel drive circuit 40 controls drive of the image display panel 30. The light source device 50 illuminates the image display panel 30 from the back surface thereof, for example. The light-source-device control circuit 60 control drive of the light source device 50.

As illustrated in FIG. 5, the image display panel 30 includes P×Q pixels 48 (P in the row direction and Q in the column direction) arrayed in a two-dimensional matrix. In the example illustrated in FIG. 5, the pixels 48 are arrayed in a matrix in a two-dimensional X-Y coordinate system. In this example, the row direction corresponds to an X-direction, and the column direction corresponds to a Y-direction. A direction orthogonal to the X-direction and the Y-direction corresponds to a Z-direction.

The pixels 48 aligned along the row direction and the column direction are controlled row by row (line by line). Specifically, the pixels 48 are controlled based on a vertical synchronization signal Vstart (refer to FIG. 9 and other figures) and a horizontal synchronization signal Vck (refer to FIG. 9 and other figures) according to a master clock CK (refer to FIG. 10 and other figures) having a predetermined frequency. The vertical synchronization signal Vstart is a signal corresponding to an update timing of frame images displayed by the image display panel 30. The horizontal synchronization signal Vck is a signal corresponding to an operation control timing for the pixels 48 line by line. The master clock CK, the vertical synchronization signal Vstart, and the horizontal synchronization signal Vck may be output from a component (e.g., a circuit including a clock generation-output circuit) of an electronic apparatus including the display apparatus. The component may be included in the image processor 10. The frequency of the master clock CK according to the present embodiment is equal to that of the vertical synchronization signal Vstart. The frequency of the horizontal synchronization signal Vck is obtained by multiplying the frequency of the vertical synchronization signal Vstart by the number of lines (Q).

The pixels 48 each include a plurality of sub-pixels 49. Specifically, the pixels 48 each include a first sub-pixel 49R, a second sub-pixel 49G, a third sub-pixel 49B, and a fourth sub-pixel 49W, for example. The first sub-pixel 49R displays a first color component (e.g., red serving as a first primary color). The second sub-pixel 49G displays a second color component (e.g., green serving as a second primary color). The third sub-pixel 49B displays a third color component (e.g., blue serving as a third primary color). The fourth sub-pixel 49W displays a fourth color component (specifically, white). The first sub-pixel 49R, the second sub-pixel 49G, the third sub-pixel 49B, and the fourth sub-pixel 49W may be hereinafter referred to as a sub-pixel 49 when they need not be distinguished from one another.

The first sub-pixel 49R, the second sub-pixel 49G, and the third sub-pixel 49B according to the present embodiment serve as a first pixel. The first pixel is a pixel to which at least one color is allocated. Red serving as the first primary color of the first sub-pixel 49R, green serving as the second primary color of the second sub-pixel 49G, and blue serving as the third primary color of the third sub-pixel 49B satisfy the conditions for the color of the first pixel. The fourth sub-pixel 49W according to the present embodiment serves as a second pixel. The second pixel is a pixel to which a high luminance color having higher luminance than that of the color of the first pixel is allocated. White satisfies the conditions for the high luminance color having higher luminance than that of red, green, and blue.

Specifically, the display device 20 is a transmissive color liquid crystal display device, for example. The image display panel 30 is a color liquid crystal display panel and includes first color filters 71R, second color filters 71G, and third color filters 71B. The first color filters 71R are arranged between the respective first sub-pixels 49R and an image observer and allow the first primary color to pass therethrough. The second color filters 71G are arranged between the respective second sub-pixels 49G and the image observer and allow the second primary color to pass therethrough. The third color filters 71B are arranged between the respective third sub-pixels 49B and the image observer and allow the third primary color to pass therethrough. The image display panel 30 includes no color filter between the fourth sub-pixels 49W and the image observer. The fourth sub-pixels 49W may be each provided with a transparent resin layer 71W instead of a color filter. The image display panel 30 with the transparent resin layers 71W can prevent the occurrence of a large gap above the fourth sub-pixels 49W, otherwise a large gap occurs because no color filter is arranged for the fourth sub-pixels 49W.

In the image display panel 30, the first sub-pixels 49R, the second sub-pixels 49G, the third sub-pixels 49B, and the fourth sub-pixels 49W are arranged in a predetermined array (e.g., a stripe array), for example. The structure and the arrangement of the first sub-pixel 49R, the second sub-pixel 49G, the third sub-pixel 49B, and the fourth sub-pixel 49W in one pixel 48 are not limited. In the image display panel 30, the first sub-pixels 49R, the second sub-pixels 49G, the third sub-pixels 49B, and the fourth sub-pixels 49W may be arranged in an array similar to a diagonal array (mosaic array), for example. Alternatively, the first sub-pixels 49R, the second sub-pixels 49G, the third sub-pixels 49B, and the fourth sub-pixels 49W may be arranged in an array similar to a delta array (triangular array) or a rectangular array, for example.

Figure 6:
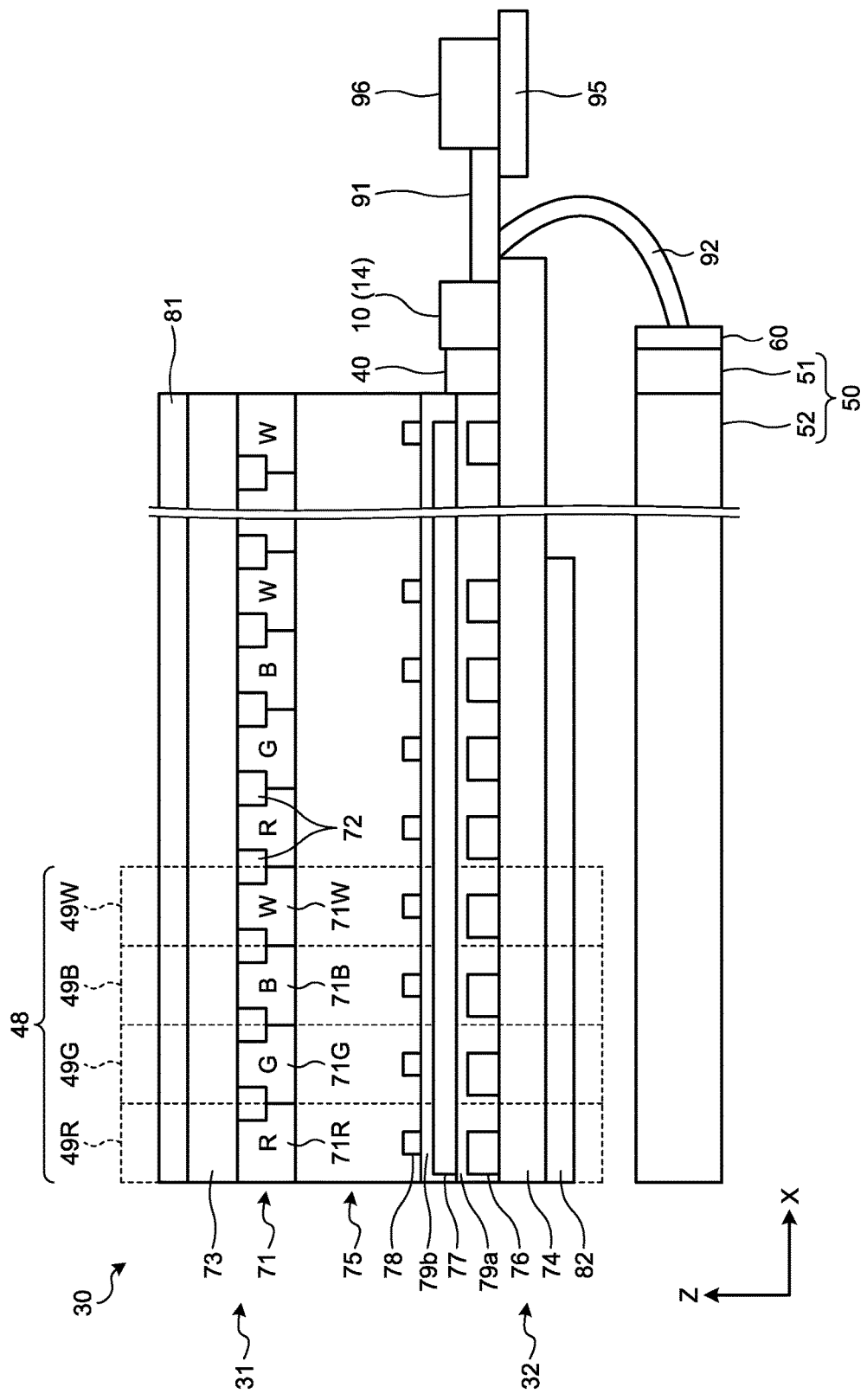
FIG. 6 is a schematic diagram of a cross-sectional structure of the image display panel.

FIG. 6 is a schematic diagram of the cross-sectional structure of the image display panel 30. The image display panel 30 includes a liquid crystal layer 75, for example, serving as a display functional layer in a space that is formed by a spacer, which is not illustrated, and provided between two substrates. In the explanation with reference to FIG. 6, a substrate positioned on the display surface side of the liquid crystal layer 75 is a first substrate 31, and a substrate positioned on the opposite side (back side) of the liquid crystal layer 75 is a second substrate 32.

The first substrate 31 includes a glass substrate 73, and the first color filters 71R, the second color filters 71G, the third color filters 71B, and a black matrix 72 provided at the glass substrate 73, for example. An area provided with a unit of control (e.g., the sub-pixel 49) in the display device 20 corresponds to an area provided with a color filter corresponding to the color allocated to the unit of control. In other words, the area is surrounded by the black matrix 72 that sections the sub-pixels 49 into a grid pattern. The black matrix 72 is provided at a position overlapping with first scanning lines GL, second scanning lines GH, and signal lines DTL in a plan view viewed from the display surface side.

The second substrate 32 includes a glass substrate 74, and thin film transistors (TFTs) 76, common electrodes 77, and pixel electrodes 78 provided at the glass substrate 74, for example. The TFTs 76, the common electrodes 77, and the pixel electrodes 78 are layered on the liquid crystal layer 75 side of the glass substrate 74 with insulating layers 79a and 79b interposed therebetween. The sub-pixel 49 is surrounded by the first scanning line GL and the second scanning line GH that are coupled to the corresponding scanning line SCL and by the signal line DTL. The sub-pixel 49 is a unit of control that is controlled by the TFT 76 arranged at the intersection of the signal line DTL and the first and second scanning lines GL and GH. The sub-pixel 49 includes a first electrode (pixel electrode 78) and a second electrode (common electrode 77). The first electrode is an individual electrode coupled to the TFT 76 provided to the sub-pixel 49. The second electrode is shared by a plurality of sub-pixels. The sub-pixel 49 is controlled by electric charges supplied to the first electrode and the second electrode. The TFT 76 and the pixel electrode 78 are individually provided to the sub-pixel 49. The common electrode 77 is shared by a plurality of sub-pixels 49. The common electrode may be what is called a solid electrode covering the entire surface of the display area or an electrode having slits or the like.

The display device 20 includes a first polarizing plate 81 and a second polarizing plate 82. The first polarizing plate 81 is provided on the display surface side of the first substrate 31. The second polarizing plate 82 is provided on the back surface side of the second substrate 32. The first polarizing plate 81 and the second polarizing plate 82 are provided such that polarization angles of light passing therethrough intersect with each other and form what is called crossed nicols.

Orientation films, which are not illustrated, may be arranged on the liquid crystal layer 75 side of the first substrate 31 and on the liquid crystal layer 75 side of the second substrate 32. The orientation films are subjected to orientation processing, such as rubbing or optical orientation, to specify initial orientation of liquid crystal molecules in the liquid crystal layer 75 serving as the display functional layer according to the present embodiment.

The arrangement of the components explained with reference to FIG. 6 is given by way of example only. The arrangement is not limited thereto and may be appropriately changed. The pixel electrodes 78 and the common electrodes 77, for example, may be layered in the opposite order. The pixel electrodes 78 and the common electrodes 77 may be provided in the same layer or at different substrates. A color filter layer 71 including the color filters, such as the first color filters 71R, the second color filters 71G, and the third color filters 71B, may be provided at the second substrate 32.

The image-display-panel drive circuit 40 includes a signal output circuit 41 and a scanning circuit 42. Specifically, the image-display-panel drive circuit 40 is provided on the glass substrate 74 of the second substrate 32 as illustrated in FIG. 6, for example. The signal output circuit 41 outputs video signals to the image display panel 30 based on image data generated by the image processor 10. The signal output circuit 41 is what is called a source driver, for example, and generates video signals for driving the pixels 48 based on image data output line by line from the image processor 10. Based on the horizontal synchronization signals Vck, the image-display-panel drive circuit 40 holds the video signals in the signal output circuit 41 and sequentially outputs them to the image display panel 30. The signal output circuit 41 is electrically coupled to the image display panel 30 via the signal lines DTL. The pixels 48 operate such that the sub-pixels 49 have light transmittance corresponding to the video signals.

The image processor 10 receives original data of image data via a first printed circuit board 91, such as flexible printed circuits (FPCs). The original data is output from a micro-processing unit (MPU) 96 on a circuit board 95 included in the image-capturing apparatus 5, for example, and is based on an image taken by the image-capturing apparatus 5.

The image processor 10 may generate video signals for driving the sub-pixels 49 based on image data, and the signal output circuit 41 may be output wiring that receives the video signals transmitted from the image processor 10 and outputs the video signals to the sub-pixels. Alternatively, the image processor 10 may generate, based on image data, video signals for driving sub-pixel groups each of which includes a plurality of sub-pixels 49, and the signal output circuit 41 may be a selector circuit that receives the video signals from the image processor 10 and outputs the video signals to the sub-pixels 49 in a time-division manner. The selector circuit includes a plurality of switching elements, for example. A first end of each of the switching elements is coupled to the signal lines, and a second end thereof is coupled to a common wiring line provided for the corresponding sub-pixel group. The common wiring line is coupled to the image processor 10. The image processor 10 supplies the common wiring line with an integrated video signal composed of the video signals corresponding to the sub-pixels 49 included in the sub-pixel group. Each of the switching elements is further coupled to a corresponding switch-changing signal line to couple the signal lines and the common wiring line based on signals from the corresponding switch-changing signal line. By shifting the timings of the signals to be supplied to the switch-changing signal line to switch the signal line to be coupled to the common wiring line, the signal output circuit 41 can supply the video signals generated for the sub-pixel group to the sub-pixels 49 thereof. With this configuration, the common wiring lines that are used to output the video signals from the image processor 10 are provided for the sub-pixel groups, respectively, such that the display device 20 requires less output wiring lines. The present embodiment is not limited to the examples described above, the processing performed by any one of the image-display-panel drive circuit 40, the image processor 10, and the MPU 96 may be performed by another component. Part or all of the processing performed by the image processor 10, for example, may be performed by the image-display-panel drive circuit 40 or the MPU 96. The arrangement of the image-display-panel drive circuit 40, the image processor 10, and the MPU 96 illustrated in FIG. 6 are given by way of example only. The arrangement is not limited thereto may be appropriately changed. The image processor 10, for example, may be provided at the first printed circuit board 91.

The signal output circuit 41 is coupled to switching circuits 47 provided for respective pixel rows of the image display panel 30 via a switching signal line AE. The signal output circuit 41 according to the present embodiment has a function to output video signals and a function to output a switching signal all_enb (refer to FIG. 9). The signal output circuit 41 includes wiring that outputs the switching signal all_enb generated by the image processor 10, for example. The signal output circuit 41 outputs the switching signal all_enb and video signals of red, green, and blue (RGB) corresponding to the light transmittance of the first sub-pixel 49R, the second sub-pixel 49G, and the third sub-pixel 49B at a frequency (a first drive frequency) corresponding to a predetermined refresh rate (e.g., 60 Hz). The signal output circuit 41 also outputs video signals for a high luminance pixel (e.g., video signals of white (W)) corresponding to the light transmittance of the fourth sub-pixel 49W at a frequency (a second drive frequency) corresponding to a refresh rate higher than the predetermined refresh rate. Specifically, the signal output circuit 41 outputs the video signals of W corresponding to the light transmittance of the fourth sub-pixel 49W at a frequency (e.g., 120 Hz) twice as high as the predetermined refresh rate. In other words, the output frequency (the first drive frequency) of the RGB video signals according to the present embodiment is half as high as the output frequency (the second drive frequency) of the W video signals. In a case where the signal output circuit 41 is a selector circuit including switching elements coupled to the respective signal lines, a first switch-changing signal line coupled to the signal line corresponding to the first sub-pixel 49R, a second switch-changing signal line coupled to the signal line corresponding to the second sub-pixel 49G, and a third switch-changing signal line coupled to the signal line corresponding to the third sub-pixel 49B each output a switch-changing signal at a frequency (the first drive frequency) corresponding to the predetermined refresh rate. A fourth switch-changing signal line coupled to the signal line corresponding to the fourth sub-pixel 49W outputs a switch-changing signal at a frequency (the second drive frequency) twice as high as the predetermined refresh rate.

The output cycle of the vertical synchronization signal Vstart according to the present embodiment corresponds to the output cycle of the video signals for the high luminance pixel. Specifically, the frequency of the vertical synchronization signal Vstart is a frequency (e.g., 120 Hz) twice as high as the predetermined refresh rate at which the RGB video signals and the switching signal all_enb are output. In other words, the frequency of the master clock CK according to the present embodiment is equal to the frequency of the vertical synchronization signal Vstart and is a frequency (e.g., 120 Hz) twice as high as the predetermined refresh rate.

The scanning circuit 42 is what is called a gate driver and outputs a drive signal to the pixel rows indicated by the image data output from the image processor 10 based on the vertical synchronization signal Vstart. Specifically, the scanning circuit 42 outputs the drive signal at a frequency (e.g., 120 Hz) twice as high as the predetermined refresh rate and in synchronization with the timings at which the video signals for the high luminance pixel are output. The image-display-panel drive circuit 40 controls on and off of the switching elements (e.g., the TFTs 76) to control the operation (e.g., display luminance, and light transmittance in this case) of the sub-pixels 49 in the image display panel 30 based on the output of the drive signal from the scanning circuit 42 and the output of the switching signal all_enb from the signal output circuit 41.

Specifically, the scanning circuit 42 is electrically coupled to the image display panel 30 by the scanning lines SCL. Turning on and off the switching elements via the scanning lines SCL by the scanning circuit 42 means turning on and off the switching elements provided along the scanning lines SCL line by line. The display device 20 can control on and off of display output line by line. In other words, the scanning lines SCL are provided line by line. More specifically, the scanning lines SCL are coupled to the respective pixel rows via the respective switching circuits 47 provided line by line. The pixel rows each include the first scanning line GL and the second scanning line GH extending in the row direction. The first scanning line GL and the second scanning line GH each transmit the drive signal. The TFTs 76 of the first sub-pixel 49R, the second sub-pixel 49G, and the third sub-pixel 49B are coupled to the first scanning line GL. The TFT 76 of the fourth sub-pixel 49W is coupled to the second scanning line GH.

The light source device 50 is arranged on the back surface side of the image display panel 30. The light source device 50 outputs light to the image display panel 30, thereby serving as a backlight that illuminates the image display panel 30. Specifically, the light source device 50 includes a light source 51 and a light guide plate 52 as illustrated in FIG. 6, for example. The light source 51 includes light emitting elements, such as light emitting diodes (LEDs). The light guide plate 52 guides light output from the light source 51 to the entire display area provided with the sub-pixels 49. The light source device 50 may further include an optical sheet, such as a prism sheet. The light source device 50 may be a front light arranged on the front surface side of the image display panel 30. In a case where the image display panel 30 is a self-luminous display device, such as an organic light emitting diode (OLED) display device or a reflective liquid crystal display device that performs display by reflecting external light on a reflective layer (reflective electrodes), for example, the light source device 50 is not required.

The light-source-device control circuit 60 controls the illumination light amount of light that is output from the light source device 50, for example. Specifically, the light-source-device control circuit 60 adjusts the electric current or the voltage supplied to the light source device 50 or the duty ratio of the signal based on light source device control signal that is output from the image processor 10. The light-source-device control circuit 60 thus controls the illumination light amount (intensity) of light that is output to the image display panel 30.

The light-source-device control circuit 60 is integrated with the light source device 50, for example. The light-source-device control circuit 60 is coupled to the image processor 10 via a second printed circuit board 92. The first printed circuit board 91 and the second printed circuit board 92 are FPCs, for example. The first printed circuit board 91 and the second printed circuit board 92 are not limited thereto and may be another circuit board.

Figure 7:
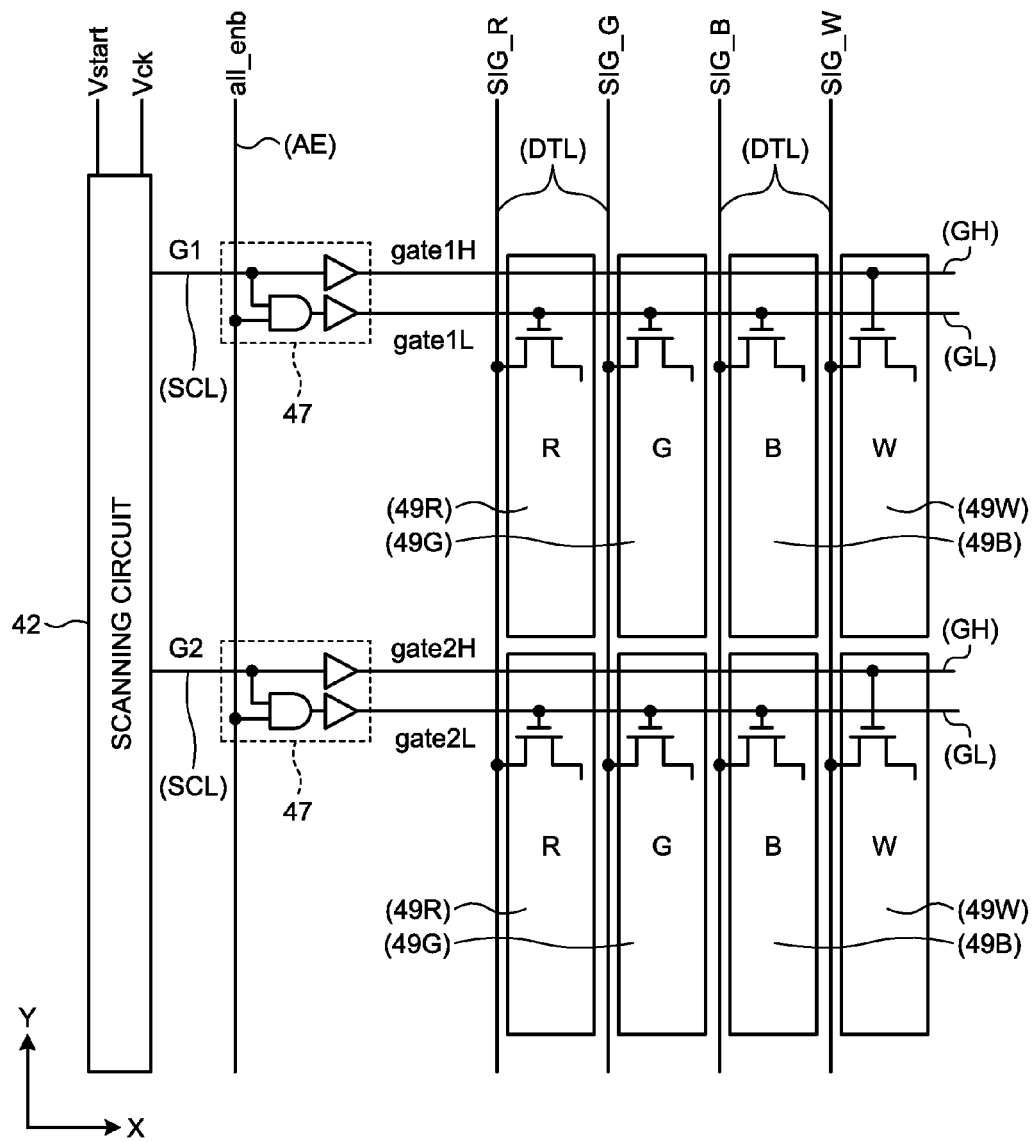
FIG. 7 is a diagram of an exemplary specific configuration of switching circuits.
Figure 8:
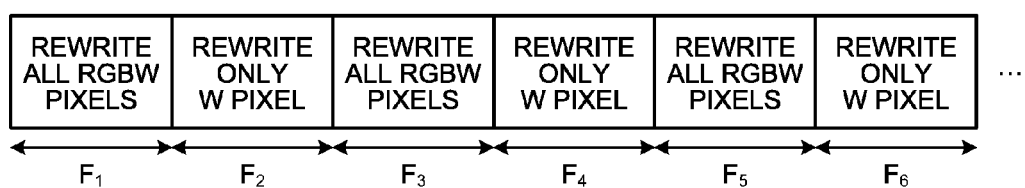
FIG. 8 is a diagram of an example of a rewriting cycle of first sub-pixels, second sub-pixels, third sub-pixels, and fourth sub-pixels.
Figure 9:
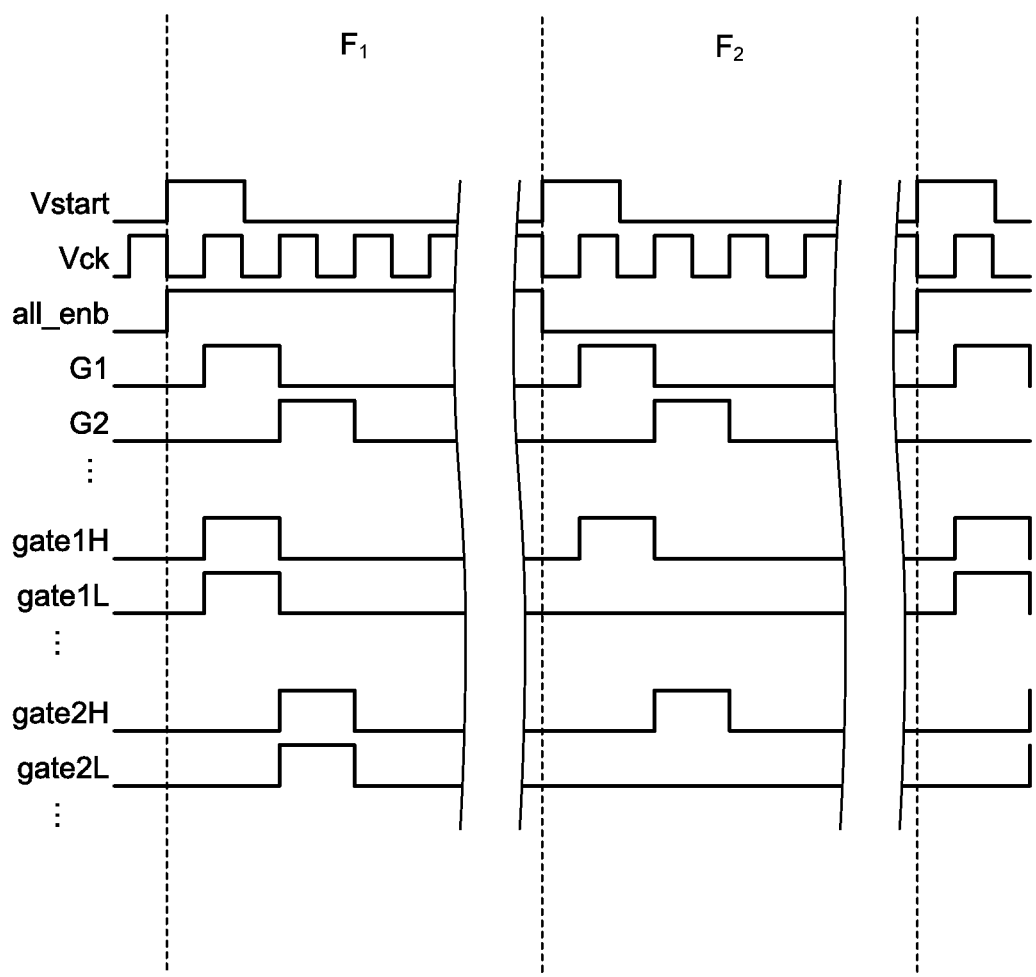
FIG. 9 is a timing chart of an example of output of signals from a drive system to rewrite the first sub-pixels, the second sub-pixels, the third sub-pixels, and the fourth sub-pixels illustrated in FIG. 7.

The following describes a timing of transmitting the drive signal and the operations of the sub-pixels 49 performed at the timing. In the description according to the present embodiment, control on the light transmittance of the sub-pixels 49 performed by the operations of the sub-pixels 49 may be referred to as "rewriting". FIG. 7 is a diagram of an exemplary specific configuration of the switching circuits 47. FIG. 8 is a diagram of an example of a rewriting cycle of the first sub-pixels 49R, the second sub-pixels 49G, the third sub-pixels 49B, and the fourth sub-pixels 49W. FIG. 9 is a timing chart of an example of output of signals from a drive system to rewrite the first sub-pixels 49R, the second sub-pixels 49G, the third sub-pixels 49B, and the fourth sub-pixels 49W illustrated in FIG. 7.

The switching circuit 47 includes an AND circuit, for example. The input side of the AND circuit is coupled to the scanning line SCL and the switching signal line AE, and the output side of the AND circuit is coupled to the first scanning line GL. The AND circuit outputs the drive signal to the first scanning line GL at the timing when both the drive signal from the scanning line SCL and the switching signal all_enb from the switching signal line AE are input to the AND circuit. As described above, the output frequency (the second drive frequency) of the drive signal is twice as high as the predetermined refresh rate. By contrast, the output frequency (the first drive frequency) of the switching signal all_enb corresponds to the predetermined refresh rate. The switching circuit 47 may include buffers at the respective positions coupled to the first scanning line GL and the second scanning line GH.

The second scanning line GH transmits the drive signal to the fourth sub-pixel 49W at a frequency (the second drive frequency) twice as high as the predetermined refresh rate. In the present embodiment, the scanning line SCL and the second scanning line GH provided for the same pixel row are directly connected in the switching circuit to be one piece of wiring. The second scanning line GH transmits the drive signal unconditionally when the drive signal is output to the scanning line SCL. This is given by way of example of the relation between the scanning line SCL and the second scanning line GH, and the present embodiment is not limited thereto. The specific configuration relating to the relation between the scanning line SCL and the second scanning line GH may be appropriately changed as long as the timing of transmission of the drive signal is the same as the timing according to the present embodiment.

In the present embodiment, rewriting of the first sub-pixel 49R, the second sub-pixel 49G, and the third sub-pixel 49B is performed at the first drive frequency corresponding to the predetermined refresh rate based on the RGB video signals output at a timing synchronized with the output timing of the switching signal all_enb. Rewriting of the fourth sub-pixel 49W is performed at the second drive frequency twice as high as the predetermined refresh rate based on the video signal for the high luminance pixel output at a timing synchronized with the output timing of the drive signal.

As illustrated in FIG. 8, for example, frames $F_1$, $F_2$, $F_3$, . . . are frames corresponding to respective periods for updating frame images in the image display panel 30 controlled according to the output cycle of the vertical synchronization signal Vstart. The output cycle of the drive signal corresponds to the output cycle of the vertical synchronization signal Vstart. Therefore, the fourth sub-pixel 49W is rewritten at the second drive frequency twice as high as the predetermined refresh rate corresponding to the output cycle of the vertical synchronization signal Vstart. As a result, the fourth sub-pixel 49W is rewritten frame by frame, for example, for each of the frames $F_1$, $F_2$, $F_3$, . . . .

By contrast, the first sub-pixel 49R, the second sub-pixel 49G, and the third sub-pixel 49B are rewritten at the first drive frequency corresponding to the predetermined refresh rate, which is half as high as the output frequency of the vertical synchronization signal Vstart. As a result, the first sub-pixel 49R, the second sub-pixel 49G, and the third sub-pixel 49B are rewritten in units of two frames, for example, for each of the frames $F_1$, $F_3$, $F_5$, . . . . In frames where rewriting is not performed on the first sub-pixel 49R, the second sub-pixel 49G, and the third sub-pixel 49B, the light transmittance controlled in the frame prior thereto where rewriting is performed is retained. At the timing of the frame $F_2$, for example, the first sub-pixel 49R, the second sub-pixel 49G, and the third sub-pixel 49B retain the light transmittance determined in rewriting performed at the timing of the frame $F_1$ prior thereto. In other words, in a case where one pixel is composed of p sub-pixels, a first period and a second period are provided, the first period being a period for rewriting q sub-pixels ($q \leq p$), and the second period being a period for rewriting r sub-pixels ($r < q$) included in one pixel. The display device 20 performs control such that the first period and the second period are alternated. At least part of the sub-pixels 49 rewritten in the first period overlaps part of the sub-pixels 49 rewritten in the second period.

The following describes a more specific example where the vertical synchronization signal Vstart and the horizontal synchronization signal Vck are output as illustrated in FIG. 9. As described above, the frequency of the horizontal synchronization signal Vck is obtained by multiplying the frequency of the vertical synchronization signal Vstart by the number of lines. The level of the horizontal synchronization signal Vck is switched between high and low according to the frequency. The start timings of the frames $F_1$, $F_2$, . . . are determined according to the output timings of the vertical synchronization signal Vstart that is output and turned high at a frequency twice as high as the predetermined refresh rate. The switching signal all_enb output at a frequency corresponding to the predetermined refresh rate is output to one of consecutive two frames (e.g., the frame $F_1$ out of the frames $F_1$ and $F_2$). In the example illustrated in FIG. 9, the switching signal all_enb is turned high in the frame $F_1$ and turned low in the frame $F_2$.

The plurality of pixel rows are individually driven based on the output timing of the horizontal synchronization signal Vck. In FIG. 7, the scanning lines SCL coupled to respective f (f=2) pixel rows out of the pixel rows in the image display panel 30 are denoted by reference numerals Gf (G1 and G2). The timing when Gf is turned high in FIG. 9 is a timing when the drive signal is output to the scanning line Gf coupled to the f-th pixel row in FIG. 7. In FIG. 7, the first scanning line GL in the f-th pixel row is denoted by a reference numeral gatefL (gate1L and gate2L). In FIG. 7, the second scanning line GH in the f-th pixel row is denoted by a reference numeral gatefH (gate1H and gate2H). The timings when gate1L, gate2L, gate1H, and gate2H are turned high in FIG. 9 are timings when the drive signal is output to the lines provided with the respective reference numerals.

During the frame $F_1$ in which the switching signal all_enb is turned high, the output conditions of the AND circuits are satisfied at the timings when the drive signal is output to the scanning lines Gf of the respective rows. As a result, the drive signal is transmitted to the first scanning line gatefL and the second scanning line gatefH at the timing when the drive signal is output. In other words, gate1L and gate1H are turned high at the timing when G1 is turned high. In this case, rewriting is performed on all the sub-pixels 49 included in the pixels 48 arranged in the first pixel row, which are the first sub-pixels 49R, the second sub-pixels 49G, the third sub-pixels 49B, and the fourth sub-pixels 49W. Similarly, gate2L and gate2H are turned high at the timing when G2 is turned high.

By contrast, during the frame $F_2$ in which the switching signal all_enb is turned low, the output conditions of the AND circuits are not satisfied at the timings when the drive signal is output to the scanning lines Gf of the respective rows. As a result, no drive signal is transmitted to the first scanning line gatefL, and the drive signal is transmitted to the second scanning line gatefH at the timing when the drive signal is output. In other words, gate1H is turned high at the timing when G1 is turned high. In this case, rewriting is performed on the fourth sub-pixels 49W arranged in the first pixel row. Similarly, gate2H is turned high at the timing when G2 is turned high.

Signal control similar to that performed on the two frames of the frames $F_1$ and $F_2$ is performed, in units of two frames, on the frames $F_3$ and $F_4$ and those subsequent thereto, which are not illustrated in FIG. 9. Control based on the vertical synchronization signal Vstart, the horizontal synchronization signal Vck, the drive signal, and the switching signal all_enb is performed, in the same manner as described above, on the sub-pixels 49 arranged in the third pixel row and those subsequent thereto, which are not illustrated in FIGS. 7 and 9.

As described above, the display apparatus includes the first scanning lines GL and the second scanning lines GH. Each of the first scanning lines GL is coupled to the first pixel (e.g., the first sub-pixel 49R, the second sub-pixel 49G, and the third sub-pixel 49B), whereas each of the second scanning lines GH is coupled to the second pixel (e.g., the fourth sub-pixel 49W). The first scanning line GL and the second scanning line GH are coupled to the corresponding scanning line SCL serving as an input line that receives the drive signal. At least the first scanning line GL is coupled to the input line via the switching circuit 47 that is configured to be switched to transmit the drive signal. The display apparatus further includes the switching signal line AE that transmits, to the switching circuit 47, the switching signal all_enb for switching between a first state in which the drive signal is transmitted to the first scanning line GL and a second state in which the drive signal is not transmitted to the first scanning line GL. When receiving both the switching signal all_enb and the drive signal, the switching circuit 47 transmits the drive signal to the corresponding first scanning line GL. The first pixel is driven at the first drive frequency. The second pixel is driven at the second drive frequency (e.g., 120 Hz) higher than the first drive frequency (e.g., 60 Hz). Specifically, the second pixel is driven at the second drive frequency twice as high as the first drive frequency.

The following describes image data output by the image processor 10. The image processor 10 generates image data of each frame based on original data received from an external component coupled to the image processor 10. The original data is image data including information on gradation values of at least red, green, and blue. Examples of the external component include the MPU 96 illustrated in FIG. 6, and a graphic accelerator of an electronic apparatus including the display apparatus according to the present embodiment. Based on the horizontal synchronization signal Vck, the image processor 10 divides the image data of each frame into pieces of image data line by line and outputs the pieces of image data. With this operation, the image display panel 30 displays the image of each frame at the cycle of the vertical synchronization signal Vstart.

The output frequency (the first drive frequency) of the RGB video signals according to the present embodiment is half as high as the output frequency (the second drive frequency) of the W video signals. If the original data including RGB components is received by the image processor 10 at the output frequency of the W video signals, rewriting at the input frequency of the original data fails to be performed on the first sub-pixel 49R, the second sub-pixel 49G, and the third sub-pixel 49B, which are rewritten at a frequency half as high as the frequency of the fourth sub-pixel 49W. As a result, it may possibly be difficult to perform accurate display output at the input frequency of the original data. To address this, if the input frequency of the original data corresponds to the output frequency (the second drive frequency) of the high luminance pixel (e.g., the W video signals) and is higher than the output frequency (the first drive frequency) of the RGB video signals, the image processor 10 according to the present embodiment performs image processing for generating image data to perform display output with high fidelity to the original data at the output frequency of the RGB video signals.

Figure 10:
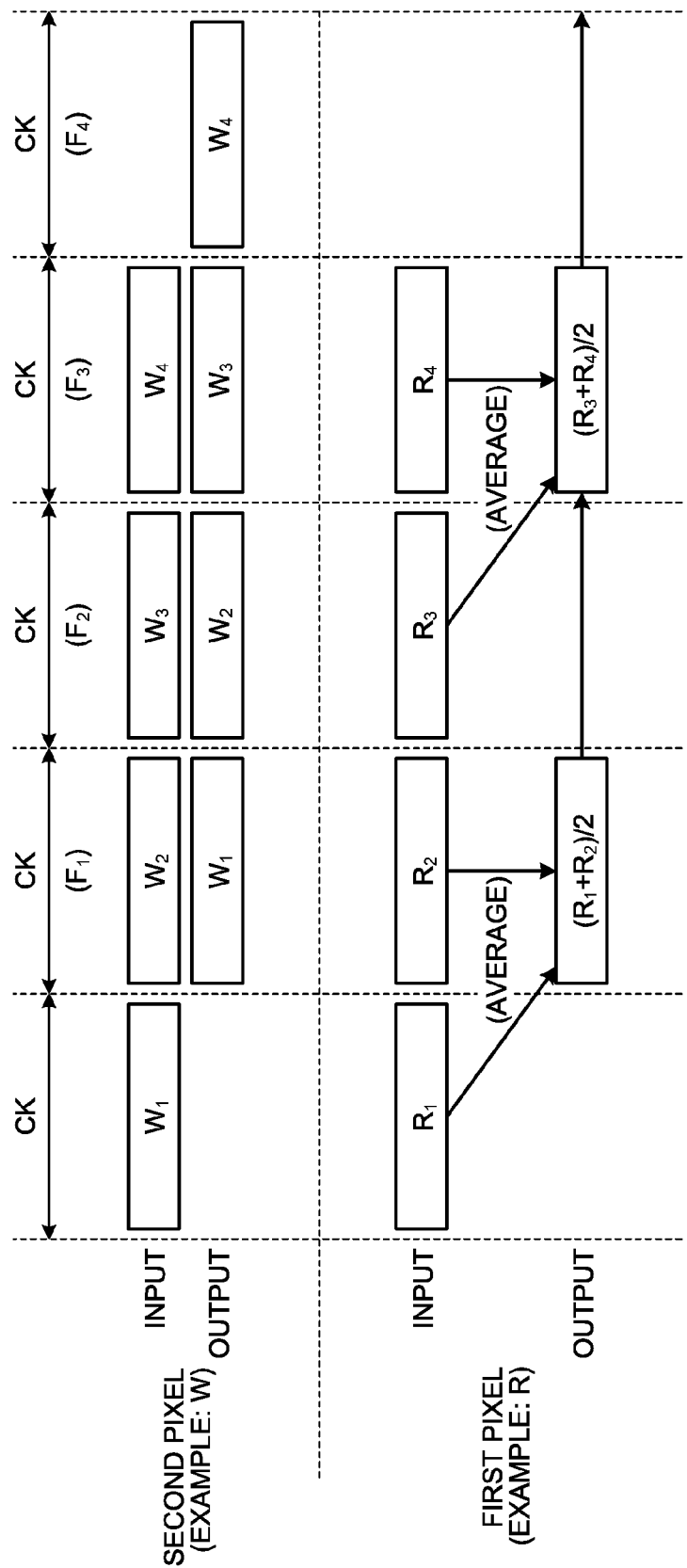
FIG. 10 is a timing chart of an example of image processing performed by an image processor and control on an input timing of original data and an output timing of image data.

FIG. 10 is a timing chart of an example of image processing performed by the image processor 10 and control on an input timing of original data and an output timing of image data. The image processor 10 performs averaging processing for averaging, in units of colors, color components output from the sub-pixels 49 (e.g., the first sub-pixel 49R, the second sub-pixel 49G, and the third sub-pixel 49B) of colors not corresponding to the high luminance pixel out of the color components included in the original data of two frames.

The following describes the case of red (R) serving as the color of the first sub-pixel 49R with reference to FIG. 10. The image processor 10, for example, averages color components $R_{(2m-1)}$ and $R_{2m}$ of red (R) out of the color components included in the original data of two frames. As a result, the image data of red (R) corresponding to the color components $R_{(2m-1)}$ and $R_{2m}$ of red (R) is expressed by $\{R_{(2m-1)}+R_{2m}\}/2$, where m is a natural number. In a case where the gradation value indicated by $R_{(2m-1)}$ is 120, and the gradation value indicated by $R_{2m}$ is 130, for example, the gradation value expressed by $\{R_{(2m-1)}+R_{2m}\}/2$ is 125. As described above, the image processor 10 outputs, to the first pixel, output data obtained by averaging the gradation values indicated by the input data of the first pixel of two times received during a period in which the second pixel is driven two times.

FIG. 10 illustrates image data of $(R_1+R_2)/2$ obtained by averaging the color components of red (R) included in the original data of the first and the second frames and image data of $(R_3+R_4)/2$ obtained by averaging the color components of red (R) included in the original data of the third and the fourth frames. The original data of the fifth frame and those subsequent thereto are also averaged in the same manner.

The image processor 10 performs the averaging processing illustrated in FIG. 10 and outputs output data (image data) at an output timing delayed from the input timing of input data (original data) by one frame period. Specifically, the original data of each frame is input at the cycle of the master clock CK. Because the frequency of the master clock CK is equal to that of the vertical synchronization signal Vstart, the cycle of the master clock CK is equal to that of the vertical synchronization signal Vstart. In other words, the cycle of the master clock CK corresponds to the update cycle of frame images. The image processor 10 outputs the image data at a timing of a frame period corresponding to the master clock CK subsequent to the master clock CK synchronized with the first timing when the original data to be subjected to the averaging processing is input.

Specifically, the image processor 10 outputs the image data of $\{R_{(2m-1)}+R_{2m}\}/2$ at the timing subsequent to the timing when the original data of $R_{(2m-1)}$ is input, that is, at a timing of a frame period when the original data of $R_{2m}$ is input. In FIG. 10, the image processor 10 outputs image data of $(R_1+R_2)/2$ at the timing subsequent to the timing when original data of $R_1$ is input, that is, at a timing of a frame period when original data of $R_2$ is input. The image processor 10 outputs image data of $(R_3+R_4)/2$ at the timing subsequent to the timing when original data of $R_3$ is input, that is, at a timing of a frame period when original data of $R_4$ is input. Original data of the fifth frame and those subsequent thereto are also subjected to the image processing in the same manner.

The image processor 10 does not perform the averaging processing on the color corresponding to the high luminance pixel and outputs image data at a timing delayed from the input timing of original data by one frame. Specifically, the image processor 10 outputs image data of $W_{(2m-1)}$ at the timing subsequent to the timing when original data of $W_{(2m-1)}$ is input, that is, at a timing of a frame period when original data of $W_{2m}$ is input. The image processor 10 outputs image data of $W_{2m}$ at the timing subsequent to the timing when the original data of $W_{2m}$ is input, that is, at a timing of a frame period when original data of $W_{(2m+1)}$ is input.

The execution of the averaging processing and the control on the input and output timing make the output timing of the image data of $\{R_{(2m-1)}+R_{2m}\}/2$ synchronized with the output timing of the image data of $W_{(2m-1)}$. The output timing of the image data of the color components subjected to the averaging processing is synchronized with the timing when the switching signal all_enb is turned high. With this setting, the image display panel 30 can perform display output based on the image data that reflects the color components of the original data of the (2m−1)-th frame at the output timing delayed from the input timing of the original data of the (2m−1)-th frame by one frame. During the frame period in which the image data of $W_{2m-1}$ is output, the image data of $\{R_{(2m-1)}+R_{2m}\}/2$ is retained without being rewritten. As a result, the signal output circuit 41 can perform display output that reflects the color components of the original data of the 2m-th frame at the output timing delayed from the input timing of the original data of the 2m-th frame by one frame.

The explanation has been made of red (R) out of the colors (RGB) that are not the color of the high luminance pixel according to the present embodiment with reference to FIG. 10. The color components of green (G) and blue (B) are also subjected to the averaging processing and the input/output timing control in the same manner.

To perform the averaging processing and the input/output timing control described with reference to FIG. 10, the image processor 10 requires a storage area that holds the original data of $R_{(2m-1)}$ until the original data of $R_{2m}$ is input to enable the averaging processing. The image processor 10 also requires a storage area that holds image data based on the data of $W_{(2m-1)}$ until it is output at an output timing delayed by one frame. The image processor 10 according to the present embodiment includes a buffer memory 11 (refer to FIG. 4) serving as the storage areas.

In the explanation with reference to FIG. 10, the image processor 10 generates the image data of $\{R_{(2m-1)}+R_{2m}\}/2$ in the averaging processing. However, this is given by way of example only. The present embodiment is not limited thereto, and the image data generated in the averaging processing may be appropriately changed. Alternatively, the image processor 10 may generate image data of $\{R_{(2m)}+R_{2(m+1)}\}/2$ in the averaging processing, for example. Specifically, the image processor 10 outputs the image data of $W_1$ and $R_1$ without performing the averaging processing in the first frame. The image processor 10 does not output image data based on the original data of $R_2$ at the timing when the image data of $W_2$ is output in the second frame and retains the image data for the averaging processing in the next frame. The image processor 10 outputs image data of $W_3$ and image data of $(R_2+R_3)/2$ after the averaging processing in the third frame. More generally, the image processor 10 outputs the image data of the first frame based on the original data of the first frame without performing the averaging processing. The image processor 10 outputs the image data of $W_{2m}$ based on the original data of the 2m-th frame. The sub-pixel 49 (e.g., the first sub-pixel 49R) other than the high luminance pixel in the 2m-th frame is retained in the display output state based on the image data of the (2m−1)-th frame. The image processor 10 outputs the image data of $W_{2(m+1)}$ and the image data of $\{R_{(2m)}+R_{2(m+1)}\}/2$ after the averaging processing in the (2m+1)-th frame. In this case, the image processor 10 can output the image data of the first frame without necessarily delaying the output timing of the image data from the input timing of the original data of the first frame, thereby reducing the delay of the output timing from the input timing.

Figure 11:
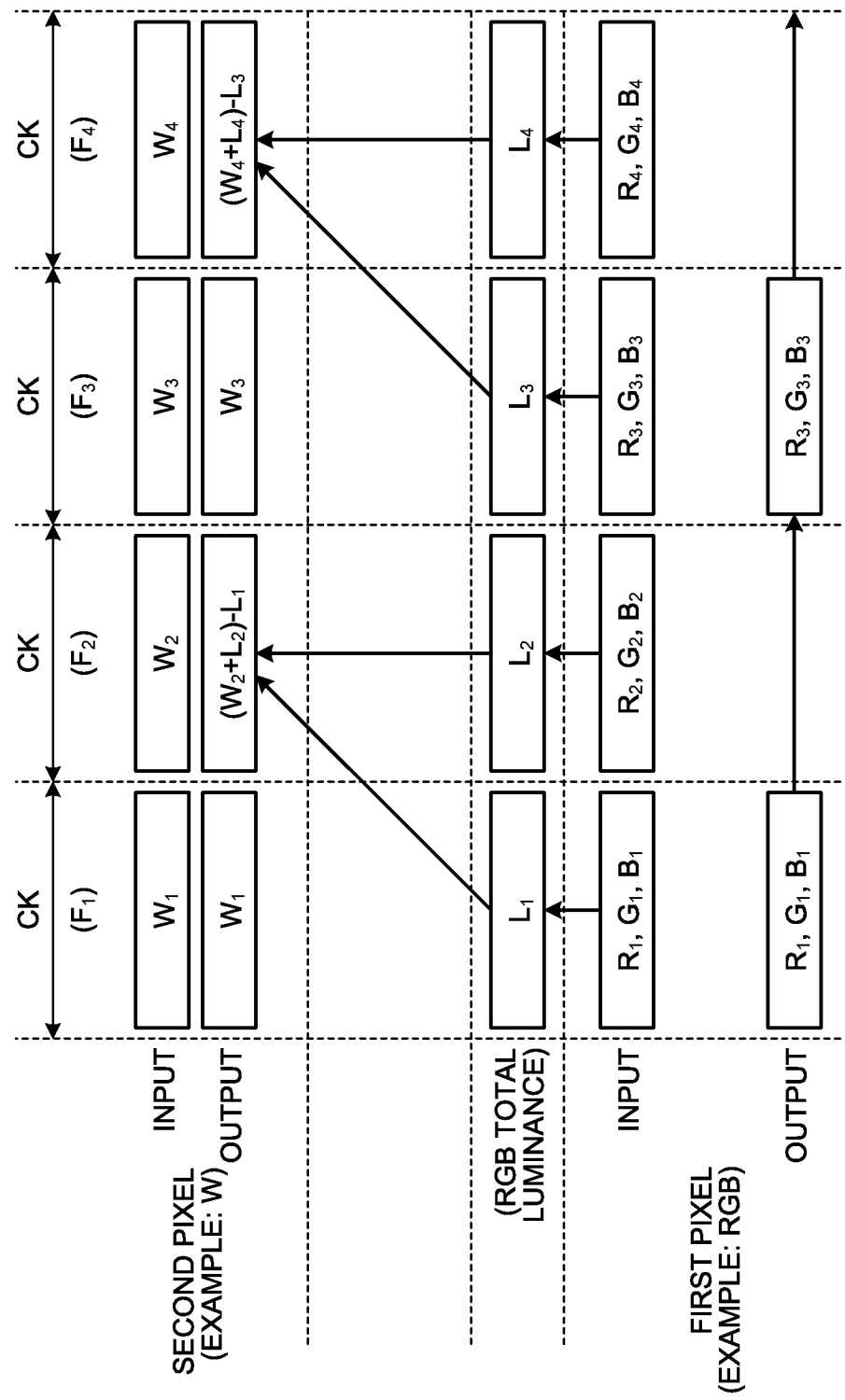
FIG. 11 is a timing chart of another example of image processing performed by the image processor and control on the input timing of original data and the output timing of image data.

The image processor 10 may output the image data of the first frame without necessarily delaying the output timing of the image data from the input timing of the original data of the first frame by other processing methods. FIG. 11 is a timing chart of another example of image processing performed by the image processor 10 and control on the input timing of original data and the output timing of image data. In the example illustrated in FIG. 11, the output timing of the switching signal all_enb is synchronized with the output timing of the image data of the (2m−1)-th frame.

In the example illustrated in FIG. 11, the image processor 10 regards image data output at the timing when the switching signal all_enb is output as the image data corresponding to all the colors. The image processor 10 regards image data output at the timing when the switching signal all_enb is not output as the image data corresponding to the color of the high luminance pixel that is obtained based on difference in luminance between the colors of the sub-pixels 49 other than the high luminance pixel. The difference in luminance between the colors of the sub-pixels 49 other than the high luminance pixel is difference between luminance $(L_{2m})$ and luminance $(L_{(2m-1)})$. The luminance $(L_{2m})$ is obtained from the colors of the sub-pixels 49 other than the high luminance pixel at the timing when the switching signal all_enb is not output. The luminance $(L_{(2m-1)})$ is obtained from the colors of the sub-pixels 49 other than the high luminance pixel out of image data output prior to the timing in which the luminance $(L_{2m})$ is obtained.

Specifically, the image processor 10 outputs image data of $R_{(2m-1)}$, $G_{(2m-1)}$, $B_{(2m-1)}$, and $W_{(2m-1)}$ in the (2m−1)-th frame. The image processor 10 separately calculates the luminance obtained from $R_{(2m-1)}$, $G_{(2m-1)}$, and $B_{(2m-1)}$ and the luminance obtained from $R_{2m}$, $G_{2m}$, and $B_{2m}$ based on Expression (1). More specifically, the image processor 10 substitutes (2m−1) or 2m for n in Expression (1). Yr, Yg, and Yb are correction values corresponding to the difference in luminance of red (R), green (G), and blue (B), respectively, in display output based on the same gradation value. More specifically, (Yr, Yg, Yb)=(0.213, 0.715, 0.072), for example, but these values are given by way of example only.

The present embodiment is not limited thereto, and the values may be appropriately changed.

$$L_n = R_n \times Yr + G_n \times Yg + B_n \times Yb \qquad (1)$$

When n=2m in Expression (1), the luminance obtained from $R_{2m-1}$, $G_{(2m-1)}$, and $B_{(2m-1)}$ is $L_{(n-1)}$, and the luminance obtained from $R_{2m}$, $G_{2m}$, and $B_{2m}$ is $L_n$. The image processor 10 corrects the gradation value ($W_n$) of the high luminance pixel in the 2m-th frame based on Expression (2):

$$W_n = (W_n + L_n) - L_{(n-1)} \qquad (2)$$

The gradation value ($W_n$) corrected by Expression (2) reflects the luminance ($L_n$) obtained from the colors of the sub-pixels 49 corresponding to the colors other than the high luminance pixel at the timing when the switching signal all_enb is not output. During the period when the switching signal all_enb is not output, the image display panel 30 retains output of the luminance ($L_{n-1}$) obtained from $R_{(2m-1)}$, $G_{(2m-1)}$, and $B_{(2m-1)}$. If the luminance ($L_n$) is simply added to the gradation value ($W_n$) of the high luminance pixel at the timing when the switching signal all_enb is not output, the luminance exceeds its proper value by the luminance ($L_{(n-1)}$). To address this, the image processor 10 corrects the gradation value ($W_n$) of the high luminance pixel by adding the luminance (+$L_n$) at the timing when the switching signal all_enb is not output and by subtracting the luminance (-$L_{(n-1)}$) the output of which is retained as indicated by Expression (2). As described above, the image processor 10 may output, to the second pixel, output data that is obtained based on the difference in luminance indicated by the input data of the first pixel of two times received during a period in which the second pixel is driven two times.

The gradation value ($W_n$) of the high luminance pixel cannot be smaller than 0. If the calculation result of Expression (2) is smaller than 0, the image processor 10 sets the gradation value ($W_n$) of the high luminance pixel to 0. The gradation value ($W_n$) of the high luminance pixel cannot be larger than the maximum value (e.g., 255 in 8-bit resolution) of the gradation value. If the calculation result of Expression (2) is larger than the maximum value of the gradation value, the image processor 10 sets the gradation value ($W_n$) of the high luminance pixel to the maximum value.

Figure 12:
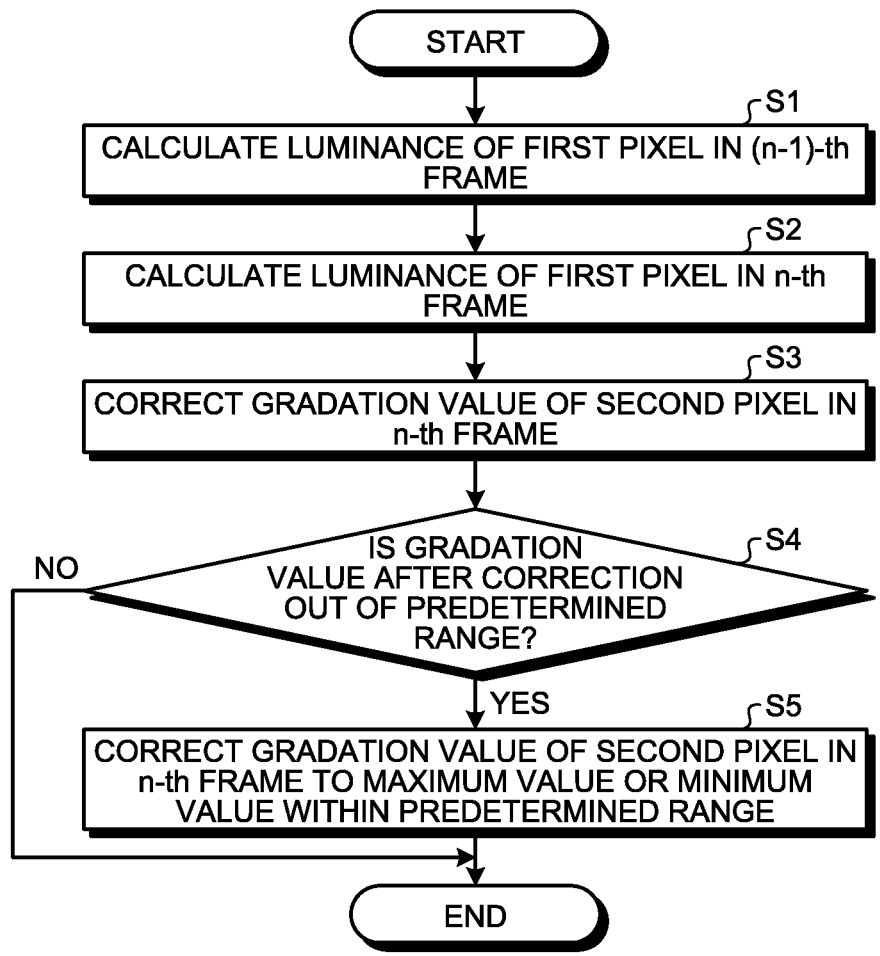
FIG. 12 is a flowchart of an example of processing for adjusting the luminance between frames.

FIG. 12 is a flowchart of an example of processing for adjusting the luminance between frames. In the flowchart illustrated in FIG. 12, the number of the frame in which corrected luminance is output is n. The image processor 10 calculates, based on Expression (1), the luminance ($L_{n-1}$) obtained from the color components of the sub-pixels 49 other than the color of the high luminance pixel in the frame (n-1) prior to the frame n in which the corrected luminance is output (Step S1). The image processor 10 calculates, based on Expression (1), the luminance ($L_n$) obtained from the color components of the sub-pixels 49 other than the color of the high luminance pixel in the frame n in which the corrected luminance is output (Step S2). The image processor 10 corrects, based on Expression (2), the gradation value ($W_n$) of the high luminance pixel in the frame n in which the corrected luminance is output (Step S3). The image processor 10 determines whether the gradation value ($W_n$) of the high luminance pixel corrected at Step S3 is out of a predetermined range (Step S4). The image processor 10 determines whether the gradation value ($W_n$) of the high luminance pixel is smaller than 0, for example. If the image processor 10 determines that the gradation value ($W_n$) of the high luminance pixel is out of the predetermined range (Yes at Step S4), the image processor 10 sets the gradation value ($W_n$) to the maximum value or the minimum value (Step S5). If the image processor 10 determines that the gradation value ($W_n$) of the high luminance pixel is smaller than 0, for example, the image processor 10 sets the gradation value ($W_n$) to 0. By contrast, if the image processor 10 determines that the gradation value ($W_n$) of the high luminance pixel is within the predetermined range (No at Step S4), the image processor 10 employs the gradation value ($W_n$) of the high luminance pixel corrected at Step S3. Specifically, if the image processor 10 determines that the gradation value ($W_n$) of the high luminance pixel is not smaller than 0, for example, the image processor 10 employs the gradation value ($W_n$) of the high luminance pixel corrected at Step S3.

Because the color of the high luminance pixel according to the present embodiment is white (W), the gradation value is assumed to be equal to the luminance value (corrected value $Y_w$=1). In a case where the color of the high luminance pixel is a color other than white, the luminance value in display output from the high luminance pixel may possibly be smaller than the gradation value. In this case, the image processor 10 multiplies $W_n$ in Expression (2) by a correction value (smaller than 1) corresponding to the difference between the luminance value and the gradation value.

Figure 13:
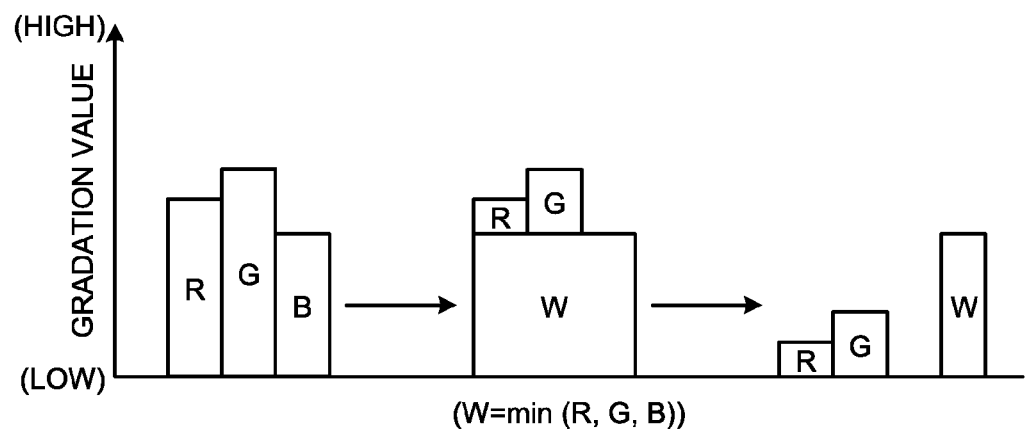
FIG. 13 is a diagram of an example of a mechanism that generates an RGBW video signal based on an RGB video signal.

The following describes a mechanism that generates RGBW image data. FIG. 13 is a diagram of an example of the mechanism that generates an RGBW video signal based on an RGB video signal. In the RGB color space, white can be output by combining the color components of red (R), green (G), and blue (B) having the same gradation value. In a case where the original data indicates the gradation values in the RGB color space, a gradation value (min(R,G,B)) equal to the minimum gradation value out of the gradation values of three colors of red (R), green (G), and blue (B) is extracted from the three colors. The gradation value equal to the extracted gradation value is determined to be that of white (W). The image data after extraction of the gradation value of white (W) is considered as image data in the RGBW color space. If white having predetermined luminance is output using the fourth sub-pixel 49W, power consumption for driving the pixels can be reduced compared with a case where white having the predetermined luminance is output using all of the first sub-pixel 49R, the second sub-pixel 49G, and the third sub-pixel 49B.

Figure 14:
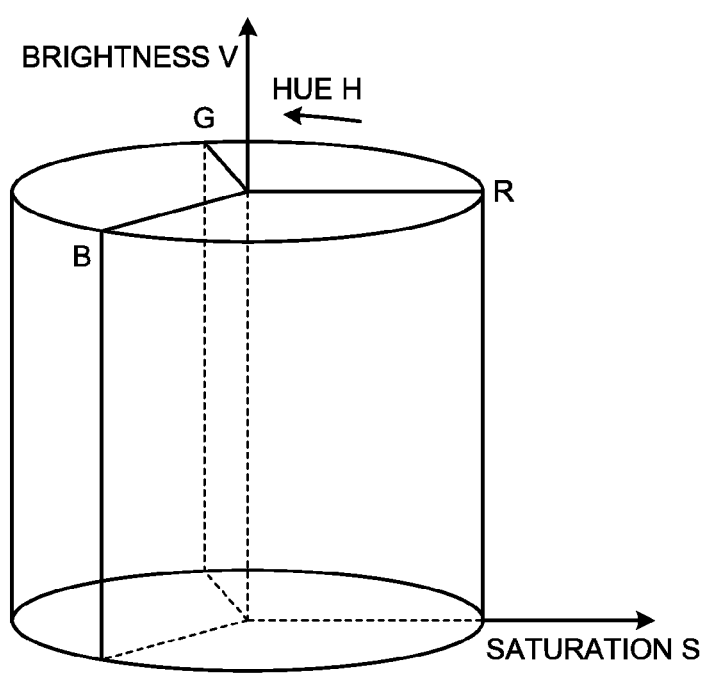
FIG. 14 is a diagram schematically illustrating a color space prior to luminance enhancement.
Figure 15:
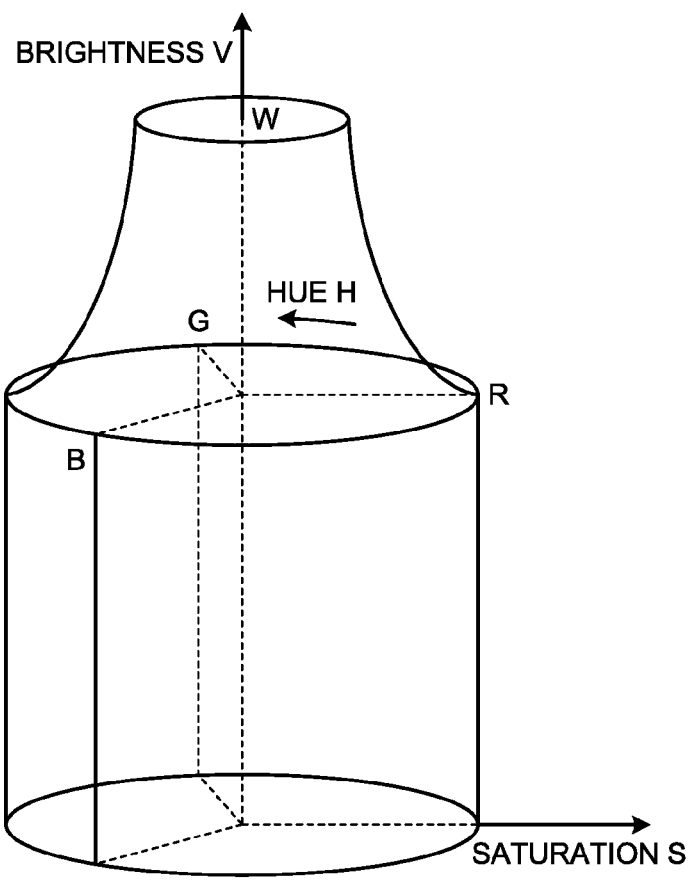
FIG. 15 is a diagram schematically illustrating a color space after the luminance enhancement.

Alternatively, RGBW image data may be generated by adding the gradation value of white (W) to the gradation values indicated by the original data, for example, by performing luminance enhancement, which will be described later. FIG. 14 is a diagram schematically illustrating a color space prior to the luminance enhancement. FIG. 15 is a diagram schematically illustrating a color space after the luminance enhancement. The relation between hue H, saturation S, and value (also called brightness) V in the RGB color space can be represented by the relation in a cylindrical color space illustrated in FIG. 14, for example. The shift direction of hue H is indicated by a direction along the circumference. Saturation S (vividness) is indicated by the radius extending from the center axis of the cylinder. Brightness V (luminosity) is indicated by a height direction along the center axis of the cylinder. In a case where the cylindrical color space is extended so as to raise the upper limit of brightness V, a color space having the following shape is formed: a truncated-cone-shaped extended color space the apex of which is leveled is added to the top of the yet-to-be-extended cylindrical color space as illustrated in FIG. 15, for example. The upper part in which the truncated-cone-shaped extended color space is extended indicates the color component of white (W) added to the yet-to-be-extended color space. It can be said that the color space in which brightness V is extended illustrated in FIG. 15 is the RGBW color space.

Figure 16:
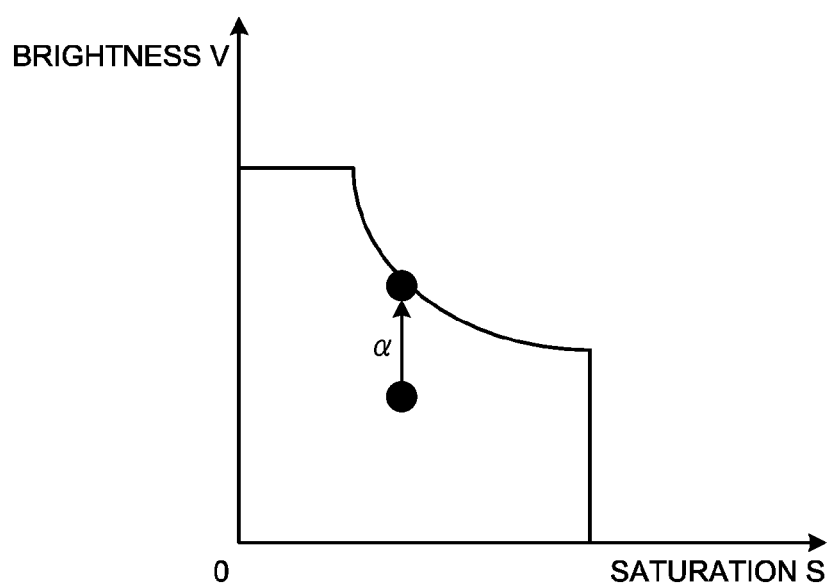
FIG. 16 is a diagram schematically illustrating improvement in luminance made by the luminance enhancement in the color space illustrated in FIG. 15.
Figure 17:
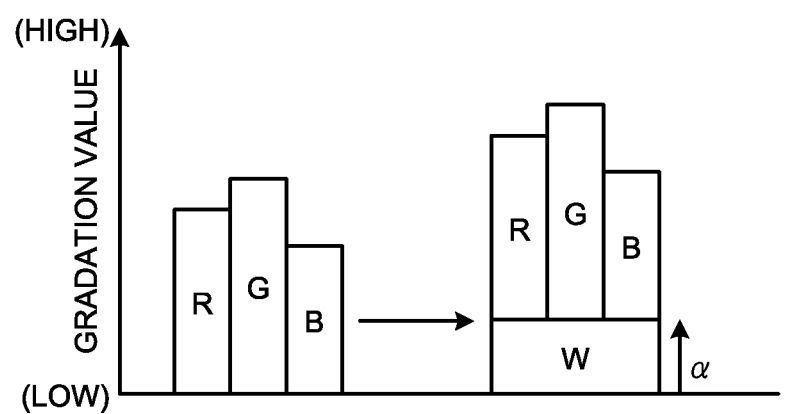
FIG. 17 is a diagram schematically illustrating a luminance component added to the video signal by the luminance enhancement.

FIG. 16 is a diagram schematically illustrating improvement in luminance made by the luminance enhancement in the color space illustrated in FIG. 15. FIG. 17 is a diagram schematically illustrating a luminance component added to the video signal by the luminance enhancement. In a color space in which the brightness is extended, the brightness of color can be increased by adding the color component of white (W) as indicated by α in FIG. 16, for example. When outputting image data based on input original data, for example, the luminance of pixels that output the image data can be increased by performing processing (luminance enhancement) of adding the color component of white (W) depending on α. The image data after the luminance enhancement is handled as image data in the RGBW color space. In this case, the gradation value (refer to FIG. 17) corresponding to the added color component of white (W) is allocated to the high luminance pixel, thereby causing the pixels 48 to perform display output based on the gradation values after the luminance enhancement.

In the present embodiment, the image processor 10 performs generation of image data in the RGBW color space by extracting the color component of white (W) and performing the luminance enhancement based on the original data in the RGB color space. In other words, the image processor 10 according to the present embodiment serves as a converter that converts the red component, the green component, and the blue component having a gradation value equal to or smaller than the minimum gradation value out of the gradation values of red, green, and blue indicated by image data (e.g., original data) into the white component. The image processor 10 according to the present embodiment also serves as an adding circuit that adds a color component (e.g., the white component of α) corresponding to the color of the second pixel to the input data. The method of extracting the color component of white (W) and performing the luminance enhancement by the image processor 10 is given by way of example of a specific method for generating image data in the RGBW color space. The method is not limited thereto and may be appropriately changed. The original data may be data in the RGBW color space, for example.

As described above, in the present embodiment, the second pixel (e.g., the fourth sub-pixel 49W) to which a high luminance color having higher luminance than that of the color of the first pixel (e.g., the first sub-pixel 49R, the second sub-pixel 49G, and the third sub-pixel 49B) is allocated is driven at the second drive frequency (e.g., 120 Hz) higher than the first drive frequency (e.g., 60 Hz) of the first pixel. Therefore, the refresh rate is increased by updating the display output state of the second pixel. An increase in the update frequency of the high luminance color allows persons to readily recognize that smoother image update is being performed. In the present embodiment, the second drive frequency of the second pixel is preferentially increased. This can reduce the increase ratio of power consumption in association with drive of the pixels 48 with respect to an increase in the refresh rate, compared with a case where the drive frequencies of all the sub-pixels 49 included in the pixels 48 are uniformly increased. Consequently, according to the present embodiment, while the refresh rate is increased, the degree of an increase in power consumption is restrained.

The display device 20 includes the first sub-pixels 49R serving as first primary color pixels to which red is allocated, the second sub-pixels 49G serving as second primary color pixels to which green is allocated, and the third sub-pixels 49B serving as third primary color pixels to which blue is allocated. The first sub-pixels 49R, the second sub-pixels 49G, and the third sub-pixels 49B serve as the first pixel, and the high luminance color is white. This configuration can facilitate display output according to RGB image data. This configuration can also facilitate display output with higher luminance using white and reduction in power consumption in high luminance output.

The display device 20 further includes the first scanning lines GL coupled to the first pixels and the second scanning lines GH coupled to the second pixels. The first scanning lines GL are coupled to the input line (e.g., the scanning lines SCL) via the respective switching circuits 47 that are configured to be switched to transmit the drive signal. With the switching circuit 47, the frequency of transmission of the drive signal to the first scanning line GL is made to be lower than that of transmission of the drive signal to the second scanning line GH, such that the second pixel is driven at the second drive frequency higher than the first drive frequency of the first pixel.

The display device 20 further includes the switching signal line AE that transmits, to the switching circuit 47, the switching signal all_enb for switching between the first state in which the drive signal is transmitted to the first scanning line GL and the second state in which the drive signal is not transmitted to the first scanning line GL. When receiving both the switching signal all_enb and the drive signal, the switching circuit 47 transmits the drive signal to the first scanning line GL. In other words, the present embodiment includes a mechanism that switches on and off (high and low) of the switching signal all_enb at the timing when the drive signal is input. This configuration facilitates making the frequency of transmission of the drive signal to the first scanning lines GL lower than that of transmission of the drive signal to the second scanning lines GH.

In the present embodiment converts, the red component, the green component, and the blue component having a gradation value equal to or smaller than the minimum gradation value out of the gradation values of red, green, and blue indicated by the image data are converted into the white component. Thus RGBW image data is output based on input of RGB original data. Consequently, the display device 20 can facilitate display output in lower power consumption using the high luminance pixel of white (fourth sub-pixels 49W).

Adding the color component corresponding to the color of the second pixel to the input data facilitates making the luminance of the pixels 48 increased.

The image processor 10 outputs, to the first pixel, output data obtained by averaging the gradation values indicated by input data of the first pixel of two times received during a period in which the second pixel is driven two times. This configuration can reduce a lack of the color component in display output performed by the first pixel driven at a drive frequency lower than that of the second pixel.

The image processor 10 outputs the output data at the output timing delayed from the input timing of the input data by one frame period. This configuration can cause the output timing of the output data obtained by averaging the gradation values indicated by the input data of the first pixel to coincide with the output timing of the output data to the second pixel that is driven based on the input data synchronized with the averaged input data. Consequently, this configuration facilitates making display output performed by the first pixel synchronized with display output performed by the second pixel.

The image processor 10 outputs, to the second pixel, output data that is obtained based on the difference in luminance indicated by the input data of the first pixel of two times received during a period in which the second pixel is driven two times. This configuration can interpolate the luminance component in display output performed by the first pixel driven at a drive frequency lower than that of the second pixel.

Modification

Figure 18:
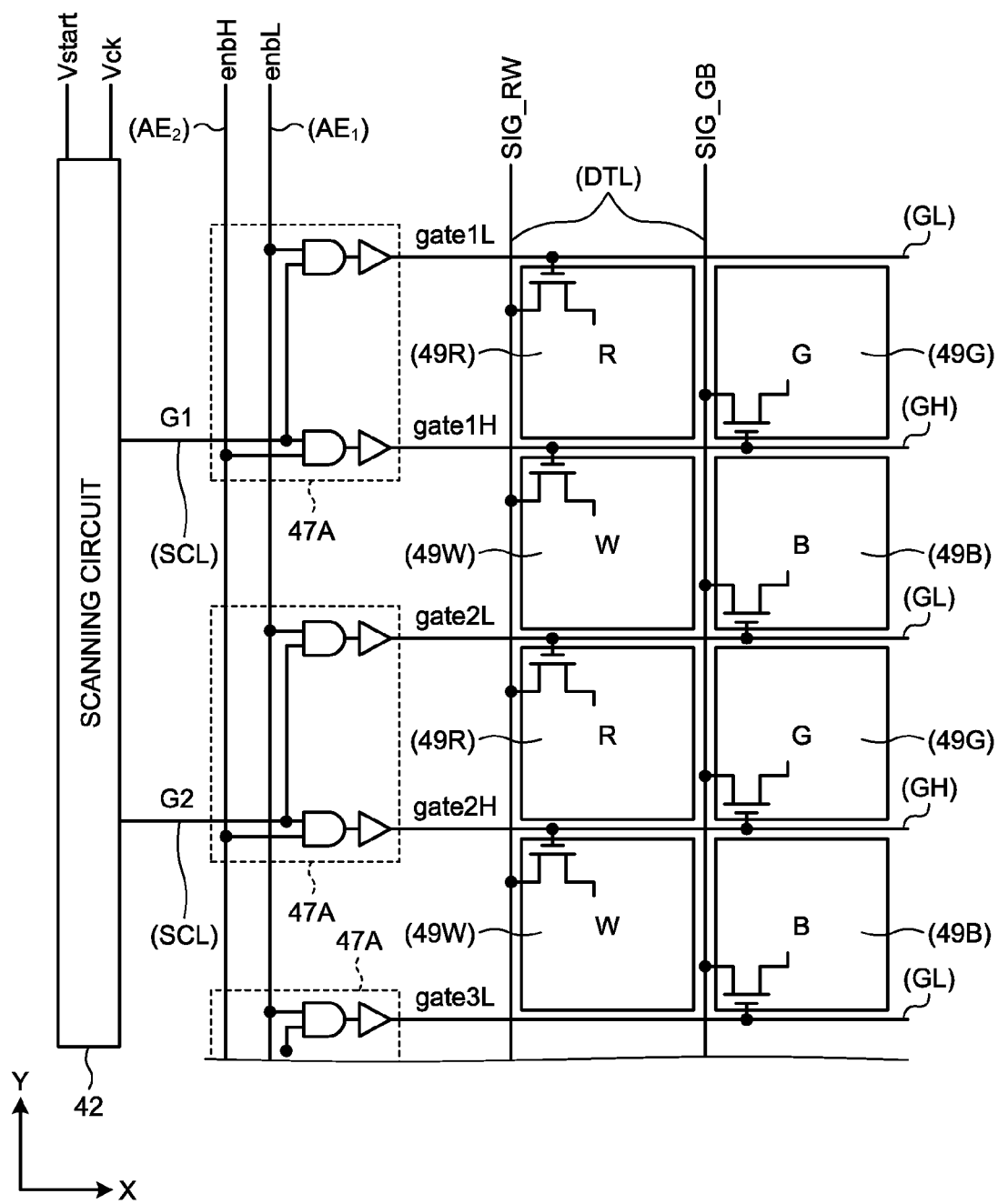
FIG. 18 is a diagram of a specific configuration of the first sub-pixels, the second sub-pixels, the third sub-pixels, and the fourth sub-pixels, and the switching circuits according to a modification.
Figure 19:
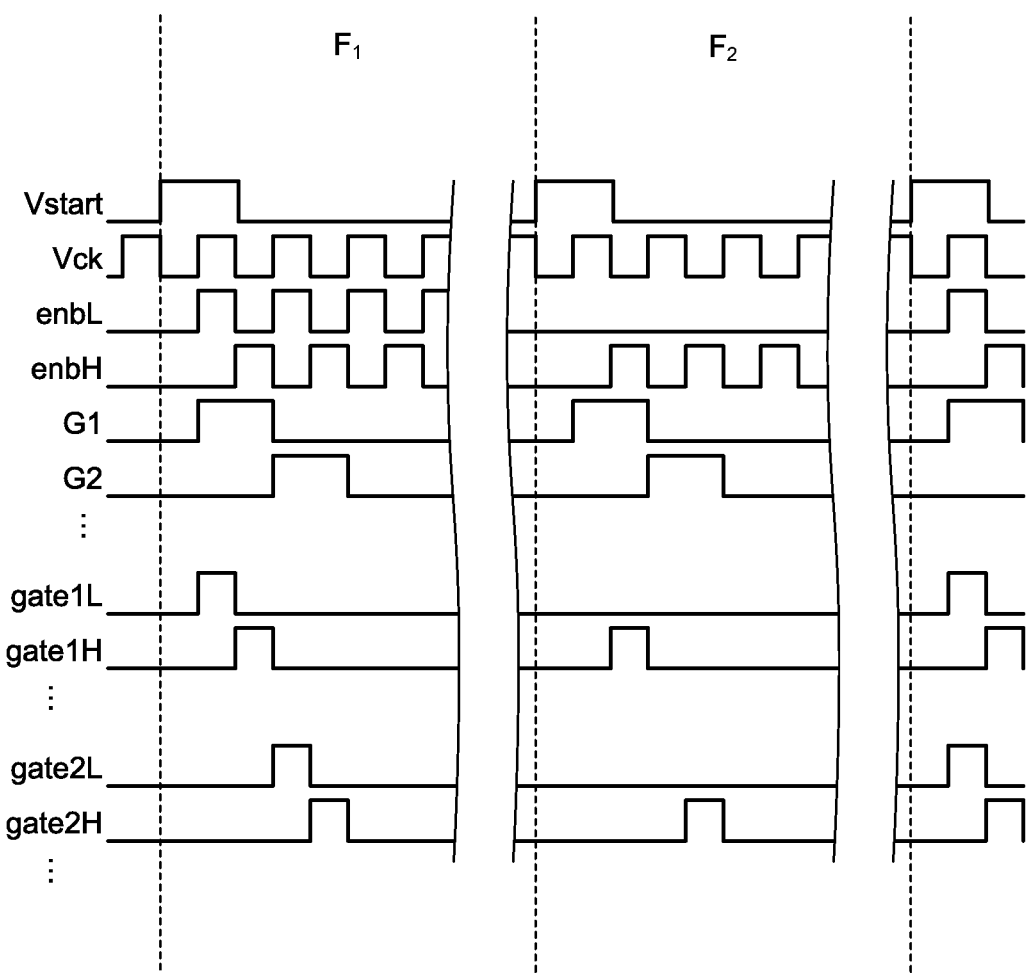
FIG. 19 is a timing chart of an example of output of signals from the drive system to rewrite the first sub-pixels, the second sub-pixels, the third sub-pixels, and the fourth sub-pixels illustrated in FIG. 18.

The following describes a modification of the embodiment according to the present invention with reference to FIGS. 18 and 19. The same components as those of the embodiment above are denoted by the same reference numerals, and explanation thereof may be omitted.

FIG. 18 is a diagram of a specific configuration of the first sub-pixels 49R, the second sub-pixels 49G, the third sub-pixels 49B, and the fourth sub-pixels 49W, and the switching circuits 47 according to the modification. One pixel according to the modification includes the first sub-pixel 49R, the second sub-pixel 49G, the third sub-pixel 49B, and the fourth sub-pixel 49W arrayed in a 2×2 matrix along the row and column directions. More specifically, the pixel 48 includes the first sub-pixel 49R arranged at the upper left, the second sub-pixel 49G arranged at the upper right, the third sub-pixel 49B arranged at the lower right, and the fourth sub-pixel 49W arranged at the lower left, for example. In this arrangement of colors of the sub-pixels 49, the fourth sub-pixels 49W and the second sub-pixels 49G, which have relatively high luminance out of the sub-pixels 49, are aligned in an oblique direction intersecting with the X-direction and the Y-direction. Compared with a case where the high luminance sub-pixels 49 are aligned in the X-direction and the Y-direction, this configuration can more reliably prevent occurrence of stripe patterns that may possibly be generated by the difference in luminance between the sub-pixels 49. The arrangement of colors of the sub-pixels 49 is given by way of example only. The arrangement is not limited thereto and may be appropriately changed.

The second sub-pixels 49G and the fourth sub-pixels 49W according to the modification are coupled to the second scanning lines GH. The first sub-pixels 49R and the third sub-pixels 49B according to the modification are coupled to the first scanning lines GL. One of the two sub-pixels 49 coupled to the first scanning lines GL is coupled to the first scanning line GL positioned outside the pixel row in which the sub-pixel 49 is arranged. Specifically, the third sub-pixel 49B in the q-th pixel row, for example, is coupled to the first scanning line GL in the q+1-th pixel row.

In the modification, instead of the switching signal line AE, a first switching signal line $AE_1$ and a second switching signal line $AE_2$ couple the signal output circuit 41 to switching circuits 47A. The switching circuits 47A according to the modification each include two AND circuits. The input side of one of the two AND circuits is coupled to the scanning line SCL and the second switching signal line $AE_2$, and the output side thereof is coupled to the second scanning line GH. The one of the two AND circuits outputs the drive signal to the second scanning line GH at the timing when both the drive signal from the scanning line SCL and a second switching signal enbH from the second switching signal line $AE_2$ are received. The input side of the other of the two AND circuits is coupled to the scanning line SCL and the first switching signal line $AE_1$ and the output side thereof is coupled to the first scanning line GL. The other of the two AND circuits outputs the drive signal to the first scanning line GL at the timing when both the drive signal from the scanning line SCL and a first switching signal enbL from the first switching signal line $AE_1$ are received.

FIG. 19 is a timing chart of an example of output of signals from the drive system to rewrite the first sub-pixels 49R, the second sub-pixels 49G, the third sub-pixels 49B, and the fourth sub-pixels 49W illustrated in FIG. 18. The signal output circuit 41 according to the modification outputs the first switching signal enbL to the first switching signal line $AE_1$ in only one of two frame periods, that is, in every other frame period. The switching cycle between high and low of the first switching signal enbL in each frame period is equal to the switching cycle between high and low of the horizontal synchronization signal Vck. The signal output circuit 41 according to the modification outputs the second switching signal enbH to the second switching signal line $AE_2$ in every frame period. The second switching signal enbH is turned high at the timing when the horizontal synchronization signal Vck is turned low after the horizontal synchronization signal Vck is turned high first in one frame period. After the timing, the status of high and low of the second switching signal enbH is a status inverted with respect to the status of high and low of the horizontal synchronization signal Vck. The output timings and the cycles of the other signals are the same as those of the embodiment above.

In the modification, the drive signal is transmitted to the first scanning line gatefL at the timing at which the drive signal of the scanning line Gf is turned high, and at which the first switching signal enbL is turned high. In the modification, the drive signal is transmitted to the second scanning line gatefH at the timing at which the drive signal of the scanning line Gf is turned high, and at which the second switching signal enbH is turned high. Therefore, the second scanning line gatefH according to the modification is supplied with the drive signal in every frame. By contrast, the first scanning line gatefL according to the modification is supplied with the drive signal in every other frame. As described above, the timings of transmission of the drive signal to the first scanning line gatefL and the second scanning line gatefH according to the modification are similar to those of the embodiment above.

As described above, the display apparatus according to the modification includes the first switching signal line $AE_1$ and the second switching signal line $AE_2$. The first switching signal line $AE_1$ transmits, to the switching circuit 47A, the first switching signal enbL for switching between the first state in which the drive signal is transmitted to the first scanning line GL and the second state in which the drive signal is not transmitted to the first scanning line GL. The second switching signal line $AE_2$ transmits, to the switching circuit 47A, the second switching signal enbH for switching between a third state in which the drive signal is transmitted to the second scanning line GH and a fourth state in which the drive signal is not transmitted to the second scanning line GH. The first scanning line GL and the second scanning line GH are coupled to the input line via the corresponding switching circuit 47A that is configured to be switched to transmit the drive signal. When receiving both the first switching signal enbL and the drive signal, the switching circuit 47A transmits the drive signal to the first scanning line GL. When receiving both the second switching signal enbH and the drive signal, the switching circuit 47A transmits the drive signal to the second scanning line GH.

The second sub-pixel 49G and the fourth sub-pixel 49W according to the modification are coupled to the corresponding second scanning line GH. In other words, the second sub-pixel 49G and the fourth sub-pixel 49W according to the modification correspond to the second pixel to which a high luminance color having higher luminance than that of the color of the first pixel is allocated. Specifically, green and white have higher luminance than that of red and blue and correspond to the high luminance color having higher luminance than that of the color of the first pixel. By contrast, the first sub-pixel 49R and the third sub-pixel 49B are coupled to the corresponding first scanning line GL and correspond to the first pixel.

As described above, according to the modification, the timings of transmission of the drive signal are made to be similar to those of the embodiment above. In addition, the display device 20 further includes the second switching signal lines $AE_2$. With this configuration, the timing of transmission of the drive signal to the second scanning lines GH can be freely determined based on the output timing of the second switching signal enbH. Consequently, the relation between the drive timings of the first pixel (e.g., the first sub-pixels 49R and the third sub-pixels 49B) and the second pixel (e.g., the second sub-pixels 49G and the fourth sub-pixels 49W) can be flexibly determined.

The embodiment and the modification have described the liquid crystal display device as an example of disclosure of the display device 20. Other application examples may include all types of flat-panel display devices, such as organic electroluminescence (EL) display devices and other self-luminous display devices. The present invention is naturally applicable to display devices having any size, including medium and small display devices and large display devices.

While three image-capturing apparatuses have been described in the embodiment with reference to FIG. 1, this is given by way of a specific example of a plurality of image-capturing apparatuses. The number of image-capturing apparatuses is not limited thereto and simply needs to be two or more. A synthesizer simply needs to synthesize two or more output contents obtained by image-capturing and output the synthesized data to the display device.

The car may include only part of the rear-view mirror system 2, the side-view mirror systems 3A and 3B, and the CID system 4. Part of the apparatuses constituting these systems may be integrated into one system. The number of display apparatuses included in the display equipment, for example, may be one or more than one. While the display apparatus 100C of the rear-view mirror system 2 of the embodiment and the modification according to the present invention performs synthesis display, the position of the display apparatus that performs the synthesis display is not limited thereto. Alternatively, the display apparatus of any one of the side-view mirror systems 3A and 3B and the CID system 4 may perform the synthesis display.

The embodiment and the modification have described the car as an example of disclosure of the movable body. The present invention is applicable not only to the car including three or more wheels and a body that enables passengers to sit on sheets in a cabin but also to a two-wheeled vehicle including such a body. The present invention is also applicable to other movable bodies, such as motorboats. In a case where the embodiment or the like according to the present invention is applied to the movable bodies described above, the display apparatus is more likely to be required to input and output data at a relatively high frame rate to display an image taken while moving. Under the conditions that the display apparatus is required to input and output data at a high frame rate, the display apparatus of the embodiment or the like according to the present invention can satisfy the requirement by driving the second pixel at a higher frequency. The embodiment or the like according to the present invention is applicable to all types of apparatuses functioning as a display apparatus for portable electronic apparatuses, such as smartphones and tablets.

The colors of the first pixel are not limited to the primary colors, such as red (R), green (G), and blue (B) and may be appropriately changed. The colors of the first pixel may be cyan (C), magenta (M), and yellow (Y), for example. The color of the second pixel simply needs to be a high luminance color having higher luminance than that of the colors of the first pixel. The colors of the first pixel may be a combination of red (R), green (G), and blue (B) or a combination of cyan (C) and magenta (M), and the color of the second pixel may be yellow (Y), for example.

While the number of colors of the first pixel according to the embodiment above is three, and the number of colors of the second pixel is one, the number of colors of the first pixel and that of the second pixel are not limited thereto. The configuration of the present invention simply needs to include the first pixel to which at least one color is allocated and the second pixel to which the high luminance color having higher luminance than that of the color of the first pixel is allocated.

Advantageous effects that are obvious from the present specification or appropriately conceivable by those skilled in the art out of other advantageous effects that are provided by the aspect described in the embodiment or the like according to the present invention including the modification are assumed to be naturally provided by the present invention. Components corresponding to the invention specification items specified by the dependent claims may be appropriately combined, for example.

What is claimed is:

1. A display apparatus comprising:
a plurality of first pixels to which at least one color is allocated; and
a second pixel to which a high luminance color having higher luminance than luminance of the color of the first pixels is allocated,
wherein the first pixels are driven at a first drive frequency,
the second pixel is driven at a second drive frequency higher than the first drive frequency,
the second frequency is a frequency that is twice as high as the first frequency, and
the display apparatus further comprises an image processor that is configured to output, to each of the first pixels, output data obtained by averaging gradation values indicated by two instances of input data of the first pixel received during a period in which the second pixel is driven two times.

2. The display apparatus according to claim 1,
wherein the first pixels include a first color pixel to which red is allocated, a second color pixel to which green is allocated, and a third color pixel to which blue is allocated, and
the second pixel is allocated white.

3. The display apparatus according to claim 2, further comprising a converter that is configured to convert a red component, a green component, and a blue component having a gradation value equal to or smaller than the minimum gradation value out of the gradation values of red, green, and blue indicated by image data into a white component.

4. The display apparatus according to claim 1,
wherein the second pixel is provided with no color filter or a transparent resin layer.

5. The display apparatus according to claim 1, further comprising:
a switching signal line that transmits, to the switching circuit, a switching signal for switching between a first state in which the drive signal is transmitted to the first scanning line and a second state in which the drive signal is not transmitted to the first scanning line,
wherein the switching circuit is configured to transmit the drive signal to the first scanning line when receiving both the switching signal and the drive signal.

6. The display apparatus according to claim 1, further comprising:
a first switching signal line that transmits, to the switching circuit, a first switching signal for switching between a first state in which the drive signal is transmitted to the first scanning line and a second state in which the drive signal is not transmitted to the first scanning line; and
a second switching signal line that transmits, to the switching circuit, a second switching signal for switching between a third state in which the drive signal is transmitted to the second scanning line and a fourth state in which the drive signal is not transmitted to the second scanning line,
wherein the first scanning line and the second scanning line are coupled to the input line via the switching circuit that is configured to be switched to transmit the drive signal, and
wherein the switching circuit is configured to transmit the drive signal to the first scanning line when receiving both the first switching signal and the drive signal and to transmit the drive signal to the second scanning line when receiving both the second switching signal and the drive signal.

7. The display apparatus according to claim 1, further comprising an adding circuit that is configured to add a color component corresponding to the color of the second pixel to input data.

8. The display apparatus according to claim 1,
wherein the image processor is configured to output the output data at an output timing delayed from an input timing of the input data by one frame period.

9. A display apparatus comprising:
a plurality of first pixels to which at least one color is allocated; and
a second pixel to which a high luminance color having higher luminance than luminance of the color of the first pixels is allocated,
wherein the first pixels are driven at a first drive frequency,
wherein the second pixel is driven at a second drive frequency higher than the first drive frequency,
wherein the second drive frequency is a frequency twice as high as the first drive frequency, and
wherein the display apparatus further comprises an image processor that is configured to output, to the second pixel, output data that is obtained based on difference in luminance indicated by two instances of input data of each of the first pixels received during a period in which the second pixel is driven two times.

10. A display apparatus comprising:
a plurality of first pixels to which a first color is allocated and that include a first one of the first pixels and a second one of the first pixels;
a plurality of second pixels to which a second color having higher luminance than luminance of the first color is allocated and that include a first one of the second pixels arranged between the first one of the first pixels and the second one of the first pixels in a first direction;
a first scanning line coupled to the first one of the first pixels and the second one of the first pixels and extending in the first direction; and
a second scanning line coupled to the first one of the second pixels and extending in the first direction,
wherein the second scanning line is coupled to an input line that receives a drive signal,
the first scanning line is coupled to the input line via a switching circuit that is configured to be switched to transmit the drive signal,
the first pixels are driven at a first drive frequency,
the second pixels are driven at a second drive frequency higher than the first drive frequency, and
the display apparatus further comprises an image processor that is configured to output, to each of the first pixels, output data obtained by averaging gradation values indicated by two instances of input data of the first pixel received during a period in which the second pixel is driven two times.

11. The display apparatus according to claim 10, wherein
at a first timing, the first one of the first pixels and the second one of the first pixels are driven via the first scanning line, and the first one of the second pixels is driven via the second scanning line, and
at a second timing, the first one of the first pixels and the second one of the first pixels are not driven via the first scanning line, and the first one of the second pixels is driven via the second scanning line.

12. The display apparatus according to claim 10, wherein
the first pixels further comprise a third one of the first pixels arranged next to the first one of the first pixels in a second direction crossing the first direction, and
the first scanning line and the second scanning line are arranged between the first one of the first pixels and the third one of the first pixels.

13. The display apparatus according to claim 10, wherein
the second pixels further comprise a second one of the second pixels arranged next to the first one of the second pixels in a second direction crossing the first direction, and
the first scanning line and the second scanning line are arranged between the first one of the second pixels and the second one of the second pixels.

14. The display apparatus according to claim 10, further comprising:
a plurality of third pixels to which a third color is allocated and that include a first one of the third pixels; and
a plurality of fourth pixels to which a fourth color is allocated and that include a first one of the fourth pixels, and
wherein the first one of the third pixels and the first one of the fourth pixels are arranged between the first one of the first pixels and the second one of the first pixels, and
the first scanning line is coupled to the first one of the third pixels and the first one of the fourth pixels.

15. The display apparatus according to claim 14, wherein the first color is red, the third color is green, and the fourth color is blue.

16. The display apparatus according to claim 10, wherein the first scanning line is not coupled to the first one of the second pixels.

\* \* \* \* \*